US012711515B2

(12) United States Patent
Kawai

(10) Patent No.: US 12,711,515 B2
(45) **Date of Patent: *Aug. 18, 2026**

(54) APPARATUS, METHOD, AND NON-TRANSITORY COMPUTER-READABLE MEDIUM FOR DETERMINING AUTOMATIC TELLER MACHINE (ATM) INCIDENT

(71) Applicant: NEC Corporation, Tokyo (JP)

(72) Inventor: Ryo Kawai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 79 days.

This patent is subject to a terminal disclaimer.

(21) Appl. No.: 18/716,202

(22) PCT Filed: Dec. 17, 2021

(86) PCT No.: PCT/JP2021/046695

§ 371 (c)(1), (2) Date: Jun. 4, 2024

(87) PCT Pub. No.: WO2023/112300

PCT Pub. Date: Jun. 22, 2023

(65) Prior Publication Data

US 2025/0029118 A1 Jan. 23, 2025

(51) Int. Cl.
*G06Q 10/10* (2023.01)
*G06Q 10/06* (2023.01)
(Continued)

(52) U.S. Cl.
CPC ......... *G06Q 30/0185* (2013.01); *G06V 20/52* (2022.01); *G06V 40/10* (2022.01); *G06V 40/20* (2022.01); *G10L 25/51* (2013.01)

(58) Field of Classification Search
CPC .... G06Q 30/0185; G06Q 20/40; G06V 20/52; G06V 40/10; G06V 40/20; G10L 25/51
(Continued)

(56) References Cited

U.S. PATENT DOCUMENTS 12,536,880 B2 1/2026 Kawai et al.
2017/0344993 A1* 11/2017 Stewart ............. G06Q 20/3224
(Continued)

FOREIGN PATENT DOCUMENTS

CN 111353784 A 6/2020
JP 2008-197939 A 8/2008
(Continued)

OTHER PUBLICATIONS

Machine translation of JP 2010-079748, Sauogawa Hisashi, "Terminal user monitoring apparatus and system", pp. 1-13. (Year: 2010).*

(Continued)

*Primary Examiner* — Jonathan P Ouellette
(74) *Attorney, Agent, or Firm* — Sughrue Mion, PLLC

(57) ABSTRACT

An information processing apparatus (10) includes a call determination unit (14) that determines whether a user who has visited an ATM is talking on a phone based on first data that is any one of a captured image, voice data, and received radio wave data related to a target area based on the ATM, an operation control unit (15) that starts acquisition of second data that suggests a state of the user and has a data type different from that of the first data in a case where it is determined that the user is talking on a phone, and a case determination control unit (16) that acquires a determination result of presence or absence of an incident using the first data and the second data.

10 Claims, 25 Drawing Sheets

(51) Int. Cl.

| | |
|---|---|
| ***G06Q 30/018*** | (2023.01) |
| ***G06Q 30/02*** | (2023.01) |
| ***G06Q 30/06*** | (2023.01) |
| ***G06V 20/52*** | (2022.01) |
| ***G06V 40/10*** | (2022.01) |
| ***G06V 40/20*** | (2022.01) |
| *G10L 25/51* | (2013.01) |

(58) Field of Classification Search
USPC .................................................. 705/1.1–912
See application file for complete search history.

(56) References Cited

U.S. PATENT DOCUMENTS

| | | | | |
|---|---|---|---|---|
| 2017/0357969 | A1* | 12/2017 | Huang | G06F 21/316 |
| 2018/0033276 | A1 | 2/2018 | Whelan et al. | |
| 2020/0410824 | A1* | 12/2020 | Bhuvad | G06V 40/172 |
| 2022/0057519 | A1* | 2/2022 | Goldstein | G01S 17/88 |
| 2025/0029458 | A1 | 1/2025 | Kawai et al. | |

FOREIGN PATENT DOCUMENTS

| | | | |
|---|---|---|---|
| JP | 2010-055231 | A | 3/2010 |
| JP | 2010-079748 | A | 4/2010 |
| JP | 2010-079755 | A | 4/2010 |
| JP | 2010-181957 | A | 8/2010 |
| JP | 2010-218392 | A | 9/2010 |
| JP | 2011-145821 | A | 7/2011 |
| JP | 2018-049592 | A | 3/2018 |
| JP | 2019-133319 | A | 8/2019 |
| JP | 2020-205119 | A | 12/2020 |
| WO | 2020/003477 | A1 | 1/2020 |

OTHER PUBLICATIONS

"Method to detect fraudulent activities on local banks based on people behavior," IP.com—Prior Art Database, IPCOM000256902D, Jan. 8, 2019. (Year: 2019).*

Machine translation of JP 2020-205119 A, Matsuo Hirosumi, "Remittance fraud prevention device, remittance fraud prevention method, and program", pp. 1-27. (Year: 2020).*

JP Office Action for JP Application No. 2023-567473, mailed on Feb. 25, 2025 with English Translation.

International Search Report for PCT Application No. PCT/JP2021/046695, mailed on Mar. 1, 2022.

International Search Report for PCT Application No. PCT/JP2021/046694, mailed on Mar. 1, 2022.

Fujishima, Noriaki et al., "Investigation of a phone call detection method using skeleton information with a Kinect," Proceedings of the 16th Forum on Information Technology 2017, vol. 3, Sep. 5, 2017.

* cited by examiner

207

| QUESTION ID | QUESTION CONTENT |
|---|---|
| Q1 | HAS THIS ACCOUNT BEEN TRANSFERRED IN PAST? |
| Q2 | HAS PHONE CALL FROM UNKNOWN PHONE NUMBER BEEN RECEIVED AND TRANSFERRED? |
| Q3 | ARE YOU PERFORMING THIS OPERATION SINCE YOU HEARD THAT YOU CAN BE GIVEN MONEY? |
| Q4 | DID YOU CHECK OR CONSULT WITH YOUR FAMILY OR ACQUAINTANCES? |

207b

| QUESTION ID | QUESTION CONTENT | PRIORITY ORDER |
|---|---|---|
| Q1 | HAS THIS ACCOUNT BEEN TRANSFERRED IN PAST? | 2 |
| Q2 | HAS PHONE CALL FROM UNKNOWN PHONE NUMBER BEEN RECEIVED AND TRANSFERRED? | 3 |
| Q3 | ARE YOU PERFORMING THIS OPERATION SINCE YOU HEARD THAT YOU CAN BE GIVEN MONEY? | 1 |
| Q4 | DID YOU CHECK OR CONSULT WITH YOUR FAMILY OR ACQUAINTANCES? | 4 |

Fig. 21

APPARATUS, METHOD, AND NON-TRANSITORY COMPUTER-READABLE MEDIUM FOR DETERMINING AUTOMATIC TELLER MACHINE (ATM) INCIDENT

This application is a National Stage Entry of PCT/JP2021/046695 filed on Dec. 17, 2021, the contents of all of which are incorporated herein by reference, in their entirety.

TECHNICAL FIELD

The present disclosure relates to an information processing apparatus, an information processing system, an information processing method, and a non-transitory computer-readable medium, and more particularly, to an information processing apparatus, an information processing system, an information processing method, and a non-transitory computer-readable medium that detect an event related to an ATM.

BACKGROUND ART

In recent years, a bank transfer fraud of a form of instructing to transfer money from an automatic teller machine (ATM) through a telephone has become a problem, and there is a demand for prevention of occurrence of a case or quick resolution. Therefore, a method of detecting a person using a mobile phone in front of an ATM and calling attention to the possibility of bank transfer fraud has been proposed.

For example, Patent Literature 1 discloses an automated transaction system that starts capturing an image of a camera and collecting voice from a microphone when a human body is detected, and draws attention of a user based on a captured image and voice.

CITATION LIST

Patent Literature

Patent Literature 1: Japanese Unexamined Patent Application Publication No. 2010-079755

SUMMARY OF INVENTION

Technical Problem

Here, in the method described in Patent Literature 1 described above, personal information of the user is collected by the camera and the microphone even in a case where the user executes a transaction without an incident, and thus, there is a problem that a psychological burden is large for the user.

In view of the above-described problems, an example object of the present disclosure is to provide an information processing apparatus, an information processing system, an information processing method, and a non-transitory computer-readable medium that contribute to prevention of occurrence of a case or quick resolution while suppressing an increase in a psychological burden on a user.

Solution to Problem

An information processing apparatus according to an aspect of the present disclosure includes:

call determination means for determining whether a user who has visited an automatic teller machine (ATM) is talking on a phone based on first data that is any one of a captured image, voice data, and received radio wave data related to a target area based on the ATM;

operation control means for starting acquisition of second data that suggests a state of the user and has a data type different from that of the first data in a case where it is determined that the user is talking on a phone; and case determination control means for acquiring a determination result of presence or absence of an incident using the first data and the second data.

An information processing system according to an aspect of the present disclosure includes:

an automatic teller machine (ATM); and an information processing apparatus, in which the information processing apparatus includes call determination means for determining whether a user who has visited the ATM is talking on a phone based on first data that is any one of a captured image, voice data, and received radio wave data related to a target area based on the ATM, operation control means for starting acquisition of second data that suggests a state of the user and has a data type different from that of the first data in a case where it is determined that the user is talking on a phone, and case determination control means for acquiring a determination result of presence or absence of an incident using the first data and the second data.

An information processing method according to an aspect of the present disclosure includes:

determining whether a user who has visited an automatic teller machine (ATM) is talking on a phone based on first data that is any one of a captured image, voice data, and received radio wave data related to a target area based on the ATM;

starting acquisition of second data that suggests a state of the user and has a data type different from that of the first data in a case where it is determined that the user is talking on a phone; and acquiring a determination result of presence or absence of an incident using the first data and the second data.

A non-transitory computer-readable medium according to an aspect of the present disclosure stores a program for causing a computer to execute:

a procedure of determining whether a user who has visited an automatic teller machine (ATM) is talking on a phone based on first data that is any one of a captured image, voice data, and received radio wave data related to a target area based on the ATM;

a procedure of starting acquisition of second data that suggests a state of the user and has a data type different from that of the first data in a case where it is determined that the user is talking on a phone; and a procedure of acquiring a determination result of presence or absence of an incident using the first data and the second data.

Advantageous Effects of Invention

According to the present disclosure, since personal information of a user is collected as necessary, it is possible to provide an information processing apparatus, an information processing system, an information processing method, and a non-transitory computer-readable medium that contribute to prevention of occurrence of a case or quick resolution while suppressing an increase in a psychological burden on the user.

BRIEF DESCRIPTION OF DRAWINGS

FIG. 21 is a diagram illustrating an example of a data structure of an operation control DB according to the fifth example embodiment.

EXAMPLE EMBODIMENT

Figure 1:
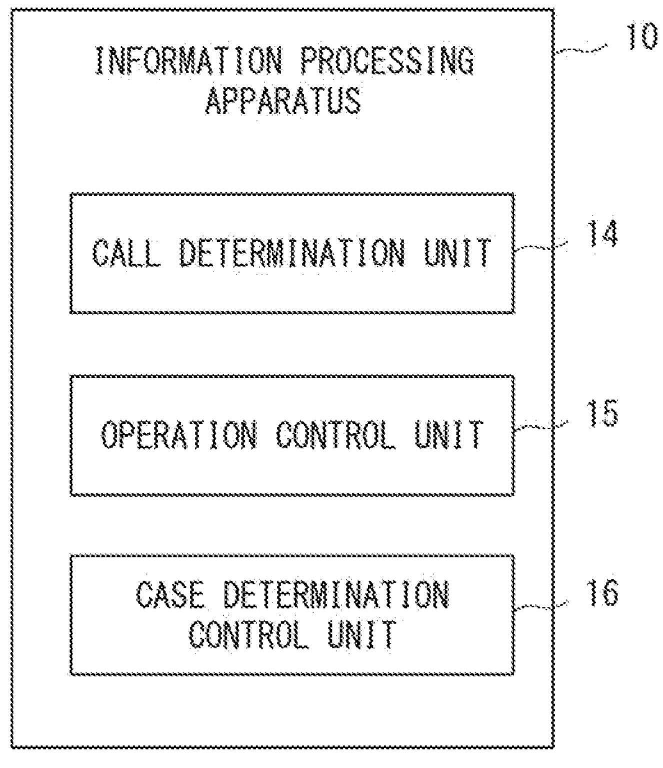
FIG. 1 is a block diagram illustrating a configuration of an information processing apparatus according to a first example embodiment.

Hereinafter, example embodiments of the present disclosure will be described in detail with reference to the drawings. In the drawings, the same or corresponding elements are denoted by the same reference numerals, and redundant description is omitted as necessary for clarity of description.

<Problems of Example Embodiment>

Here, problems of the example embodiment will be described again.

In recent years, there has been a problem of bank transfer fraud in a form of instructing to transfer money from an ATM through a telephone, and there has been a demand for prevention of occurrence of a case or quick resolution. Therefore, a method of detecting a person using a mobile phone in front of an ATM and calling attention to the possibility of bank transfer fraud has been proposed.

However, in a case where attention is uniformly attracted to a user who uses a mobile phone but executes a transaction without an incident, discomfort is given to the user. Therefore, there is a need to reduce the psychological burden on the user by not taking measures such as calling attention in a case where there is no incident.

In order to determine the presence or absence of the incident, it is considered that it is necessary to collect detailed information of a user individual. However, even in a case where the user executes a transaction without the incident, when personal information of the user is collected by a camera and a microphone, there is a problem that a psychological burden is large for the user.

In addition, when it takes time to determine the presence or absence of the incident, there is a problem that the psychological burden on the user increases.

The following example embodiments have been made to solve any of these problems.

<Definition of Terms>

In the following, the following terms are defined as follows.

"Visiting an ATM" may mean standing or sitting in a target area based on the ATM. The target area is an area around the ATM, and is an area where a user usually stands or sits when operating the ATM. The target area may be a predetermined area in front of the ATM.

The "determination result on the presence or absence of the incident" is also called an incident determination result, and is information directly indicating the presence or absence of the incident or information indirectly indicating the presence or absence of the incident. The information indirectly indicating the presence or absence of the incident may be information indicating different contents depending on the presence or absence of the incident.

The "frame image" is an example of the captured image.

First Example Embodiment

Next, a first example embodiment of the present disclosure will be described. The first example embodiment can be described as outlines of second and third example embodiments described later. In the first example embodiment, collection of personal information of a user as necessary suppresses an increase in a psychological burden on the user.

FIG. 1 is a block diagram illustrating a configuration of an information processing apparatus 10 according to the first example embodiment. The information processing apparatus 10 is a computer system that detects an incident event related to an ATM. The incident refers to an event involving or possibly involving a crime. For example, the incident may refer to a possibility that an ATM visit user associated with the event is involved in a crime. Furthermore, for example, the incident may refer to a possibility that the ATM visit user related to the event is executing a crime. The crime refers to an illegal and responsible act falling under the constituent elements of a crime prescribed in the Criminal Code and other criminal laws. The crime may be a fraud, in particular a bank transfer fraud. The information processing apparatus 10 includes a call determination unit 14, an operation control unit 15, and a case determination control unit 16.

The call determination unit 14 is also referred to as call determination means. The call determination unit 14 determines whether the user who has visited the ATM is talking on a phone based on the first data related to the target area. The first data is data directly or indirectly suggesting a state of the user or a situation in which the user is placed. Hereinafter, at least one of the state of the user and the situation in which the user is placed is simply referred to as a "state". The first data is data at least suggesting a state of a call using a mobile phone or the like, and is any one of a captured image, voice data, and received radio wave data.

The captured image related to the target area is a captured image generated by capturing by a camera installed to capture the target area. When the user visits the ATM, the call determination unit 14 detects an image area of at least a part of the body of the user from the captured image. In particular, in a case where the user is talking on a mobile phone, the call determination unit 14 determines whether the user is talking on a phone by detecting a phone call action of the user from the captured image by image analysis.

The voice data related to the target area is voice data generated by a microphone installed so as to collect the voice in the target area. When the user visits the ATM, the call determination unit 14 detects the voice of the user or the voice of a calling party from the voice data. In particular, in a case where the user is talking on a mobile phone, the call determination unit 14 specifies a phrase or a conversation content spoken by the user from the voice data by voice recognition, and determines whether the user is talking on a call using the mobile phone.

The received radio wave data related to the target area is data of a radio wave received by an antenna configured to receive a radio wave in the target area. The call determination unit 14 determines whether the user is talking on a call using the mobile phone from a reception duration of the radio wave in a frequency band of the mobile phone.

The operation control unit 15 is also referred to as operation control means. In a case where it is determined that the user is talking on a phone, the operation control unit 15 starts acquisition of second data. The second data is data directly or indirectly suggesting the state of the user. The second data is different from the first data in the data type. The indirectly suggesting data is, for example, an image indicating appearance or behavior or voice data indicating speech. That is, the operation control unit 15 further collects basic data for grasping the state of the user in detail. Note that the operation control unit 15 does not acquire the second data in a case where the user does not talk on a phone.

For example, in a case where the first data is a captured image related to the target area, the second data may be voice data related to the target area. Then, in a case where it is determined that the user is talking on the phone based on the captured image, the operation control unit 15 may control activation of the microphone or start reception of voice data.

Furthermore, for example, in a case where the first data is voice data related to the target area, the second data may be a captured image related to the target area. Then, in a case where it is determined that the user is talking on a phone based on the voice data, the operation control unit 15 may control activation of the camera or start reception of the captured image.

When the first data is the received radio wave data, the second data may be one or both of the captured image of the target area and the voice data related to the target area. Then, in a case where it is determined that the user is talking on a phone based on the received radio wave data, the operation control unit 15 may control activation of at least one of the camera and the microphone or may start reception of at least one of the captured image and the voice data.

The case determination control unit 16 is also referred to as case determination control means. The case determination control unit 16 acquires the determination result (incident determination result) of the presence or absence of the incident using the first data and the second data. For example, the case determination control unit 16 may grasp the state of the user in more detail based on the first data and the second data, and determine the presence or absence of the incident based on the state of the user. Furthermore, for example, the case determination control unit 16 may transmit the first data and the second data to an interested party terminal used by an interested party such as a person in charge or a security guard, and the interested party may determine the presence or absence of the incident. Then, the case determination control unit 16 may receive the incident determination result from the interested party terminal.

Figure 2:
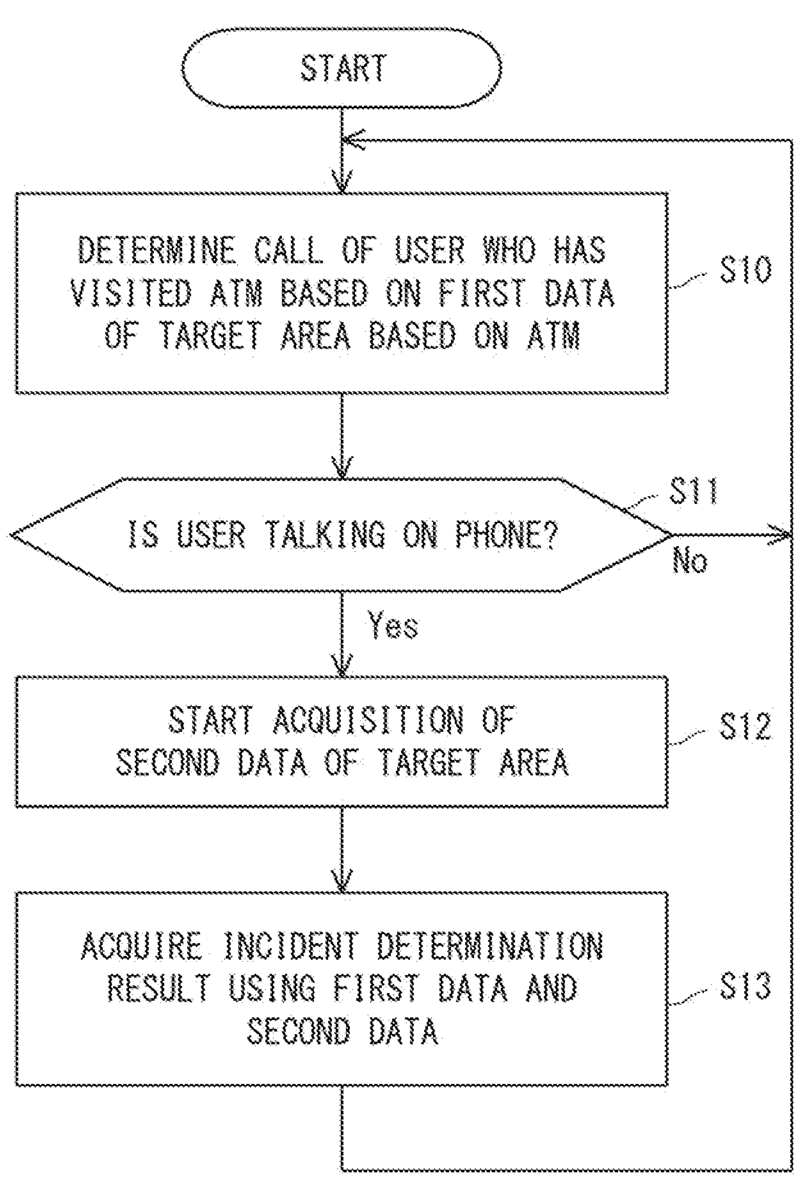
FIG. 2 is a flowchart illustrating a flow of an information processing method according to the first example embodiment.

FIG. 2 is a flowchart illustrating a flow of the information processing method according to the first example embodiment. First, the call determination unit 14 of the information processing apparatus 10 determines the call of the user who has visited the ATM based on the first data related to the target area based on the ATM (S10). When the user is not talking on the phone (No in S11), the call determination unit 14 repeats the processing illustrated in S10. Meanwhile, when the user is talking on the phone (Yes in S11), the operation control unit 15 starts acquisition of the second data related to the target area (S12). Then, the case determination control unit 16 acquires the incident determination result using the first data and the second data (S13).

As described above, according to the first example embodiment, the information processing apparatus 10 additionally collects personal information suggesting the state of the user in a case where the ATM visit user is talking on a phone, and acquires the incident determination result from the collected information. This can contribute to the prevention of the occurrence of the case or the quick resolution. Since the personal information of the user is not additionally collected when the user does not talk on the phone, an increase in a psychological burden on the user can be suppressed. In addition, the information processing apparatus 10 grasps the presence or absence of the incident, so that the information processing apparatus 10 or the interested party can take an action according to the presence or absence of the incident. Therefore, it is possible to avoid an unpleasant situation in which attention is attracted in a case where the user executes a transaction without the incident. This also makes it possible to suppress an increase in the psychological burden on the user.

Second Example Embodiment

Figure 3:
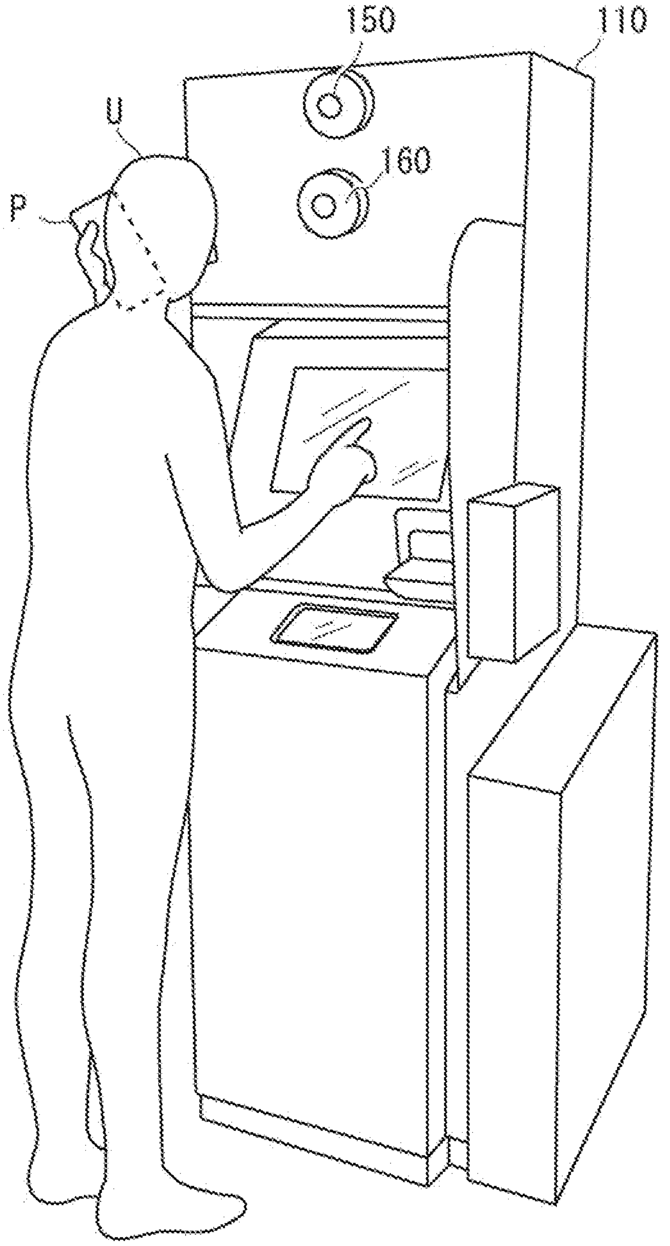
FIG. 3 is a diagram for explaining a phone call action according to a second example embodiment.

Next, a second example embodiment of the present disclosure will be described. FIG. 3 is a diagram for describing a phone call action according to the second example embodiment. An ATM system 100 is a computer system including an ATM 110 and peripheral devices thereof. Specifically, the ATM system 100 includes the ATM 110, a camera 150, and a microphone 160. A user U visits the ATM 110 to use the camera 150 and stands in front of the ATM 110. At this time, the user U is located in a target area in front of the ATM 110. Then, withdrawal, deposit, transfer, and the like of cash are instructed while operating the operation screen of the ATM 110.

The camera 150 is disposed at a position and an angle at which at least a part of the body of the user U who has visited the ATM 110 can be captured. For example, the camera 150 is disposed above the ATM 110. In the second example embodiment, the camera 150 is configured to capture an upper body of the user U, but may be configured to capture only a face area instead.

Here, when the user U who has visited the ATM 110 is talking a call using the mobile phone P, the camera 150 captures the user U who is making a call. The video data is an example of the first data described above. As a result, it is possible to determine whether the user U who has visited the ATM 110 is talking on the phone.

Further, the microphone 160 is disposed at a predetermined position based on the ATM 110. In the drawing, the microphone 160 is disposed above the ATM 110. The microphone 160 collects the voice of the user U who has visited the ATM 110 and generates the voice data. Note that the installation position of the microphone 160 is not limited thereto, and the microphone 160 may be anywhere as long as it is a position where the voice in the target area can be collected.

Here, when the user U who has visited the ATM 110 is talking a call using the mobile phone P, the microphone 160 is activated. Then, the microphone 160 collects the conversation of the user U during the call. This voice data is an example of the second data described above. As a result, the talk content of the user information U during the call can be grasped.

That is, in the second example embodiment, the presence or absence of the incident is determined based on at least the video data and the voice data.

Figure 4:
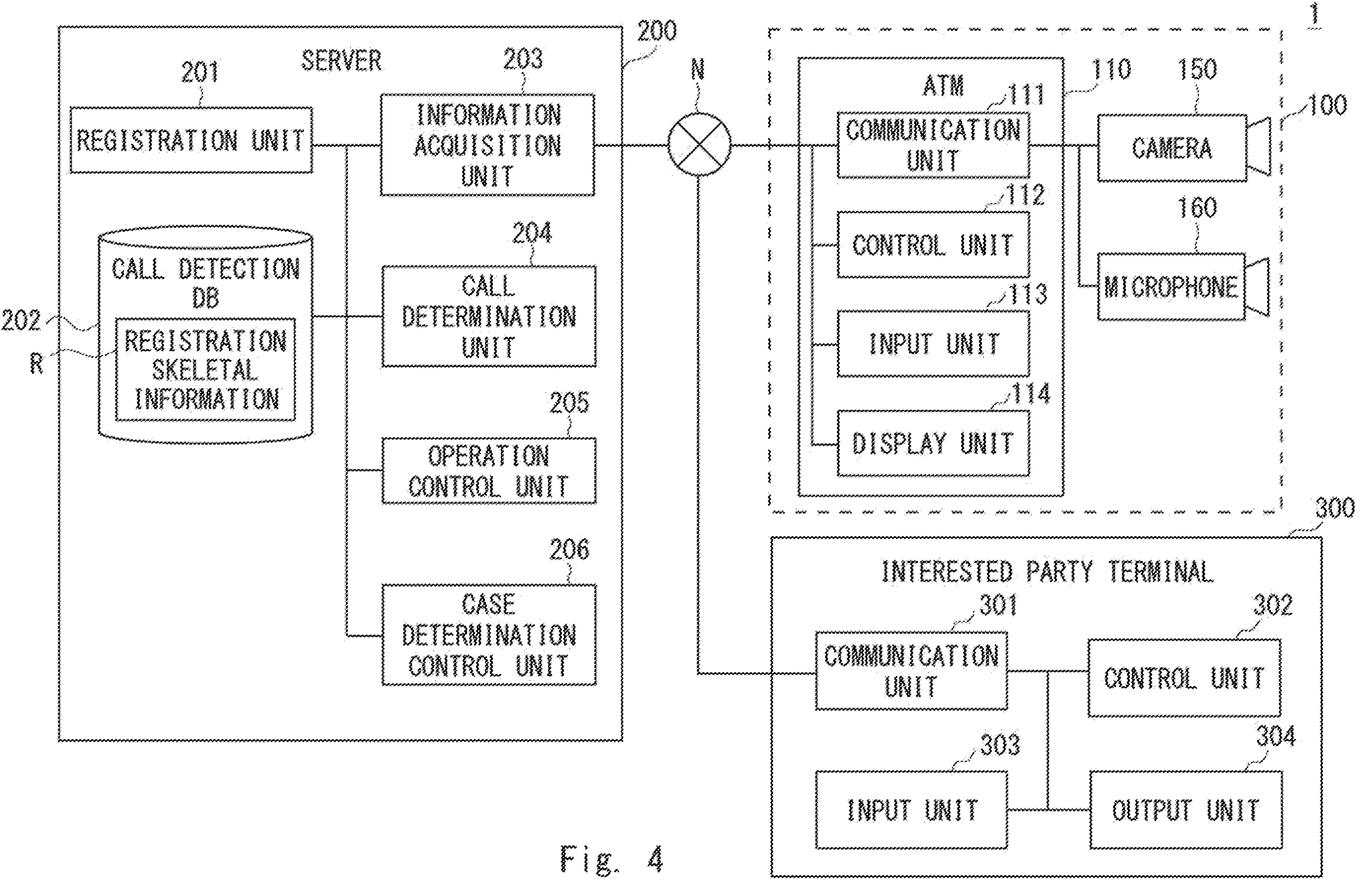
FIG. 4 is a block diagram illustrating an overall configuration of an information processing system according to a second example embodiment.

FIG. 4 is a block diagram illustrating an overall configuration of an information processing system 1 according to the second example embodiment. The information processing system 1 is a computer system that determines whether the user U who has visited the ATM 110 is involved in the case and takes measures to prevent the case or quickly resolve the case. The information processing system 1 includes a server 200 and an interested party terminal 300 in addition to the ATM system 100 described above.

(ATM System 100)

As described above, the ATM system 100 includes the ATM 110, the camera 150, and the microphone 160. The camera 150 and the microphone 160 are connected to the ATM 110.

The ATM 110 includes a communication unit 111, a control unit 112, an input unit 113, and a display unit 114.

The communication unit 111 is a communication interface with a network N. The input unit 113 is an input device that receives an input. The display unit 114 is an example of an output unit and is a display device. The input unit 113 and the display unit 114 may be integrally configured like a touch panel.

The control unit 112 controls hardware included in the ATM 110. The control unit 112 executes a normal operation (processing of withdrawal, deposit, transfer, and the like of cash) of the ATM 110 based on the input operation from the user U received by the input unit 113. In the present second example embodiment, the operation mode of the ATM 110 that executes the normal operation described above may be referred to as a "normal mode".

Furthermore, the control unit 112 acquires video data from the camera 150 via the communication unit 111. Then, the control unit 112 transmits the video data to the server 200 via the network N at a predetermined timing.

For example, the control unit 112 starts transmission of video data to the server 200 in response to reception of a predetermined first operation by the input unit 113. The transmission of the video data may be transmission of a series of video data including a plurality of frame images, or may be transmission of frame images in units of frames. The first operation may be an operation (starting a screen or the like) by the user U for starting various services (withdrawal, deposit, or transfer of cash) using the ATM 110, or may be an operation (selecting "transfer" or the like) by the user U for starting the transfer service. The first operation may be a specific operation for receiving various services. As an example, the first operation may be an insertion operation of a cash card or a passbook, or an input operation of a passcode.

Furthermore, for example, the control unit 112 ends the transmission of the video data to the server 200 in response to the input unit 113 accepting a predetermined second operation. The second operation is an operation different from the first operation. The second operation may be an operation (such as selection of termination) for ending terminating various services at the ATM 110, or may be another operation (such as selection of "start next transaction") by the user U for terminating the transfer service. Note that the trigger for ending the transmission of the video data to the server 200 may be that any operation has not been accepted for a predetermined time instead of accepting the second operation, or that the ATM 110 has executed processing of returning a cash card or a passbook.

Furthermore, in a case where a control signal for activating the microphone 160 is received from the server 200, the control unit 112 activates the microphone 160. Then, the control unit 112 acquires voice data from the microphone 160 via the communication unit 111. Then, the control unit 112 transmits the voice data to the server 200 via the network N.

When receiving a mode switching control signal from the server 200 via the communication unit 111, the control unit 112 switches the operation mode of the ATM 110. Then, the control unit 112 performs display or voice output according to the operation mode. For example, when receiving a control signal for switching from the normal mode to a warning mode, the control unit 112 causes the display unit 114 to display warning information corresponding to the warning mode. At this time, the control unit 112 may cause a voice output unit (not illustrated) to output the warning information by voice.

(Server 200)

The server 200 is a computer apparatus that is an example of the information processing apparatus 10 described above. The server 200 detects the phone call action of the user U based on the video data received from the ATM 110, and causes the interested party to determine the presence or absence of the possibility of the incident based on the collected voice data with the detection of the phone call action. Then, when the interested party determines that there is an incident, the server 200 causes the ATM 110 to switch the operation mode of the ATM 110.

The server 200 includes a registration unit 201, a call detection DB 202, an information acquisition unit 203, a call determination unit 204, an operation control unit 205, and a case determination control unit 206.

The registration unit 201 is also referred to as registration means. The registration unit 201 acquires a registration image indicating at least a phone call action of a person in response to a registration request from a device (not illustrated) used by an administrator of the ATM 110 or a person who manages bank information, or in response to an operation of the administrator of the server 200. The registration image may be an image in which a person is simply talking on a phone, or an image indicating an operation in which a person is talking on a phone and performing an input operation of an ATM. Note that the registration image may be a still image (one frame image) or a moving image including a series of a plurality of frame images.

Then, the registration unit 201 supplies the registration image to the call determination unit 204 to be described later, and acquires the skeletal information extracted from the registration image from the call determination unit 204 as registration skeletal information R. Then, the registration unit 201 registers the acquired registration skeletal information R in the call detection DB 202 as a phone call action.

The call detection DB 202 is a storage device that stores one or a plurality of pieces of registration skeletal information R corresponding to the phone call action.

The information acquisition unit 203 is also referred to as information acquisition means. The information acquisition unit 203 acquires the video data received from the ATM 110. As a result, the information acquisition unit 203 acquires a frame image included in the video data. That is, the information acquisition unit 203 acquires the frame image in response to the ATM 110 detecting the first operation signal related to the first operation. Here, the first operation signal is a signal indicating that the input unit 113 has received the first operation from the user U to the ATM 110. The information acquisition unit 203 supplies the acquired frame image to the call determination unit 204.

Further, the information acquisition unit 203 acquires voice data received from the ATM 110. The information acquisition unit 203 supplies the acquired voice data to the case determination control unit 206.

When the ATM 110 receives another operation from the user U, the information acquisition unit 203 receives a signal indicating the operation content and notifies the case determination control unit 206 of the operation content.

The call determination unit 204 is an example of the above-described call determination unit 14. The call determination unit 204 determines whether the user U is talking on a phone based on a frame image included in the video data. For example, the call determination unit 204 extracts skeletal information from the frame image and compares the extracted skeletal information with the registration skeletal information R registered in the call detection DB 202 to determine whether a call is being made. The skeletal information is information including a "key point" that is a characteristic point such as a joint and a "bone (bone link)" indicating a link between the key points. Then, the call determination unit 204 supplies a call determination result to the operation control unit 205.

The operation control unit 205 is an example of the operation control unit 15 described above. When it is determined that the user U is talking on a phone, the operation control unit 205 transmits a control signal for activating the microphone 160 to the ATM 110 via the network N. The control signal is also referred to as a microphone on control signal. As a result, in a case where the information acquisition unit 203 determines that the user is talking on a phone, acquisition of voice data suggesting a state related to the phone call of the user U, in particular, the talk content is started via the information acquisition unit 203. Then, the voice data is supplied to the case determination control unit 206 via the information acquisition unit 203.

The case determination control unit 206 is an example of the case determination control unit 16 described above. The case determination control unit 206 acquires the incident determination result using the frame image of the video data which is the first data and the voice data which is the second data.

In the second example embodiment, specifically, the case determination control unit 206 transmits the frame image and the voice data to the interested party terminal 300 as data suggesting the state of the user, thereby urging the interested party to determine the presence or absence of the incident. Hereinafter, data that is transmitted to the interested party terminal 300 and suggests the state of the user is referred to as state-related data. The frame image included in the state-related data may include a frame image of a predetermined period before the microphone on control, or may include a frame image of a predetermined period after the microphone on control. Next, the case determination control unit 206 receives the incident determination result from the interested party terminal 300. The incident determination result may be information on the presence or absence of the incident that the interested party has input to the interested party terminal 300, or may be a notification transmitted from the interested party terminal 300 only in a case where there is the incident. In the latter case, when it is determined that there is the incident, the case determination control unit 206 receives the notification indicating that there is the incident from the interested party terminal 300, and when it is determined that there is no incident, the case determination control unit does not receive the notification. Therefore, the case determination control unit 206 can grasp the incident determination result by the presence or absence of the notification.

In addition, the case determination control unit 206 receives the incident determination result from the interested party terminal 300, and performs control to switch the operation mode of the ATM 110 to a predetermined operation mode in a case where it is determined that there is the incident. Specifically, the case determination control unit 206 transmits a mode switching control signal for switching to the operation mode to the ATM 110. The operation mode may be referred to as a third operation mode. The third operation mode is an operation mode for executing an operation different from a normal operation. Accordingly, the ATM 110 switches the operation mode to the third operation mode. Note that the case determination control unit 206 may supply the incident determination result to the operation control unit 205, and the operation control unit 205 may transmit the mode switching control signal.

Here, the operation in the third operation mode includes at least one of an operation of displaying warning information, an operation of stopping transfer or suspending transfer, and an operation for securing time.

In the transfer suspension operation, it may be clearly indicated that the transfer is suspended on the display screen, or the transfer may be suspended in the internal processing while the fact that the transfer is completed is displayed on the display screen. In the latter case, it seems that the transfer is completed, but this is because there is a possibility that the user U is confused at the time of the transfer operation, and there is a possibility that the user U is excessively confused even when the interested party or the like points out the case. After the ATM 110 suspends the transfer, the interested party or the staff of the bank may contact the registered family member and confirm that there is no incident, the ATM 110 may complete the transfer.

The operation for securing the time may be an operation for securing a time until the interested party or the police arrives at the ATM 110, or may be an operation for securing a time for causing the user U to check whether there is a bank transfer fraud calmly. Specifically, the operation for securing time may be to interrupt the normal transfer processing and cause the ATM 110 to output information different from the normal transfer processing.

Alternatively or additionally, the operation of the third operation mode may include an operation of notifying the police or an operation of transmitting a radio wave that disturbs reception of a radio wave of the mobile phone in the target area. The operation of transmitting interfering radio waves may be an operation in which the ATM 110 activates a transmitter that transmits interfering radio waves in the target area.

(Interested Party Terminal 300)

The interested party terminal 300 is an information terminal used by the interested party. The interested party terminal 300 receives the frame image and the voice data from the case determination control unit 206 of the server 200, and prompts the interested party to determine the presence or absence of the incident. Then, the interested party terminal 300 returns information according to the determination result, that is, an incident determination result to the case determination control unit 206.

The interested party terminal 300 includes a communication unit 301, a control unit 302, an input unit 303, and an output unit 304.

The communication unit 301 is a communication interface with the network N. The input unit 303 is an input device that receives an input. The output unit 304 may include a display unit that is a display device and a voice output unit that is a speaker. The input unit 303 and the display unit may be integrally configured like a touch panel.

The control unit 302 controls hardware included in the interested party terminal 300. For example, in a case where the control unit 302 receives the frame image and the voice data from the case determination control unit 206 of the server 200, the frame image is displayed on the display unit of the output unit 304, and the voice data is output to the voice output unit of the output unit 304. Then, in a case where the control unit 302 receives the input of the incident determination result from the interested party via the input unit 303, the control unit transmits the incident determination result to the server 200 via the communication unit 301.

Figure 5:
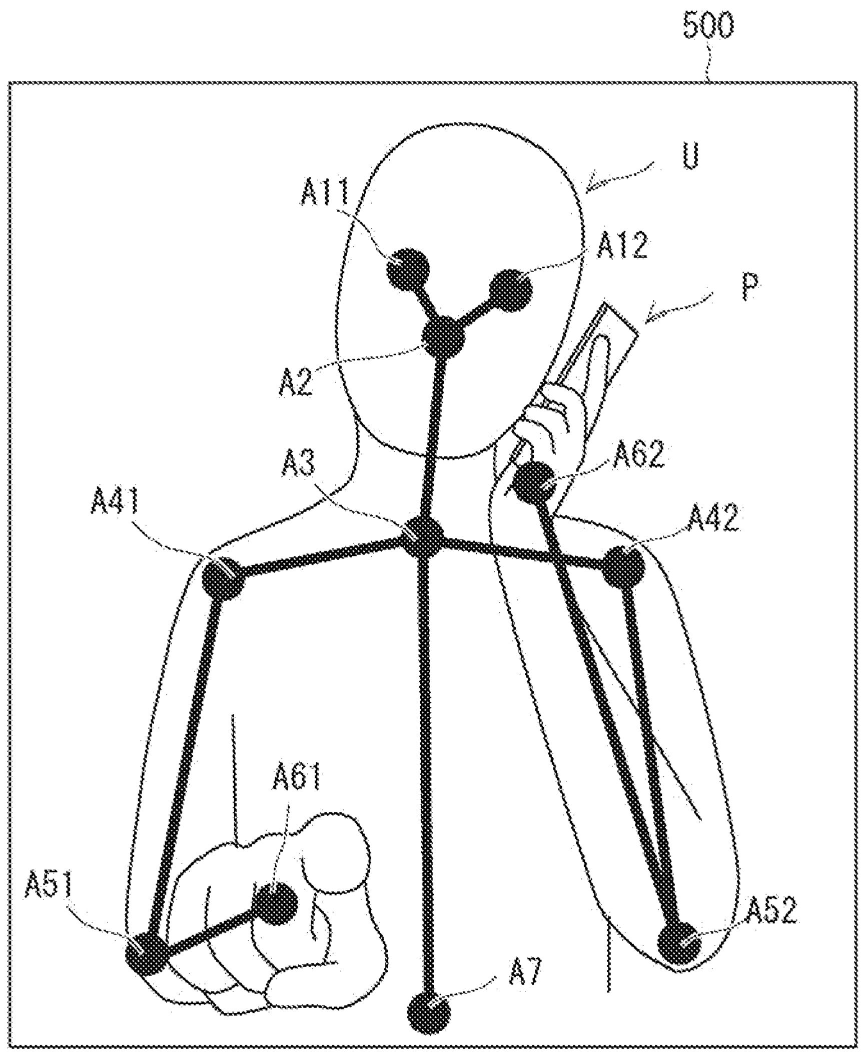
FIG. 5 is a diagram illustrating skeletal information extracted from a frame image according to the second example embodiment.

FIG. 5 is a diagram illustrating skeletal information extracted from a frame image according to the second example embodiment. The frame image 500 includes an image area of the upper body of the user U who is talking on the mobile phone P. Furthermore, the skeletal information illustrated in FIG. 5 includes a plurality of key points and a plurality of bones detected from the upper body. As an example, in FIG. 5, as key points, a right eye A11, a left eye A12, a head A2, a neck A3, a right shoulder A41, a left shoulder A42, a right elbow A51, a left elbow A52, a right hand A61, a left hand A62, and a waist A7 are illustrated.

The call determination unit 204 of the server 200 compares such skeletal information with the registration skeletal information R corresponding to the upper body, and determines whether these are similar, thereby detecting the phone call action. Note that, in order to detect the phone call action, it is important whether the hand is located near the head. Therefore, the call determination unit 204 may calculate the similarity by weighting a positional relationship between the right hand A61 and the right eye A11 or the head A2 and a positional relationship between the left hand A62 and the left eye A12 or the head A2. Alternatively, the call determination unit 204 may use only skeletal information related to the right eye A11, the left eye A12, the head A2, the right hand A61, and the left hand A62 among the extracted skeletal information for similarity calculation. In addition, the phone call action includes a form in which a call is made while the mobile phone P is held by hand, and a form in which a call is made while an ear is brought close to the mobile phone P while the mobile phone P is supported by a shoulder. In this case, the positional relationship between the right shoulder A41 and the right eye A11 or the head A2 and the positional relationship between the left shoulder A42 and the left eye A12 or the head A2 may be added to the weighting target. Alternatively, the server 200 may add skeletal information related to the right shoulder A41 and the left shoulder A42 in addition to skeletal information related to the right eye A11, the left eye A12, the head A2, the right hand A61, and the left hand A62 as the skeletal information used for similarity calculation.

Figure 6:
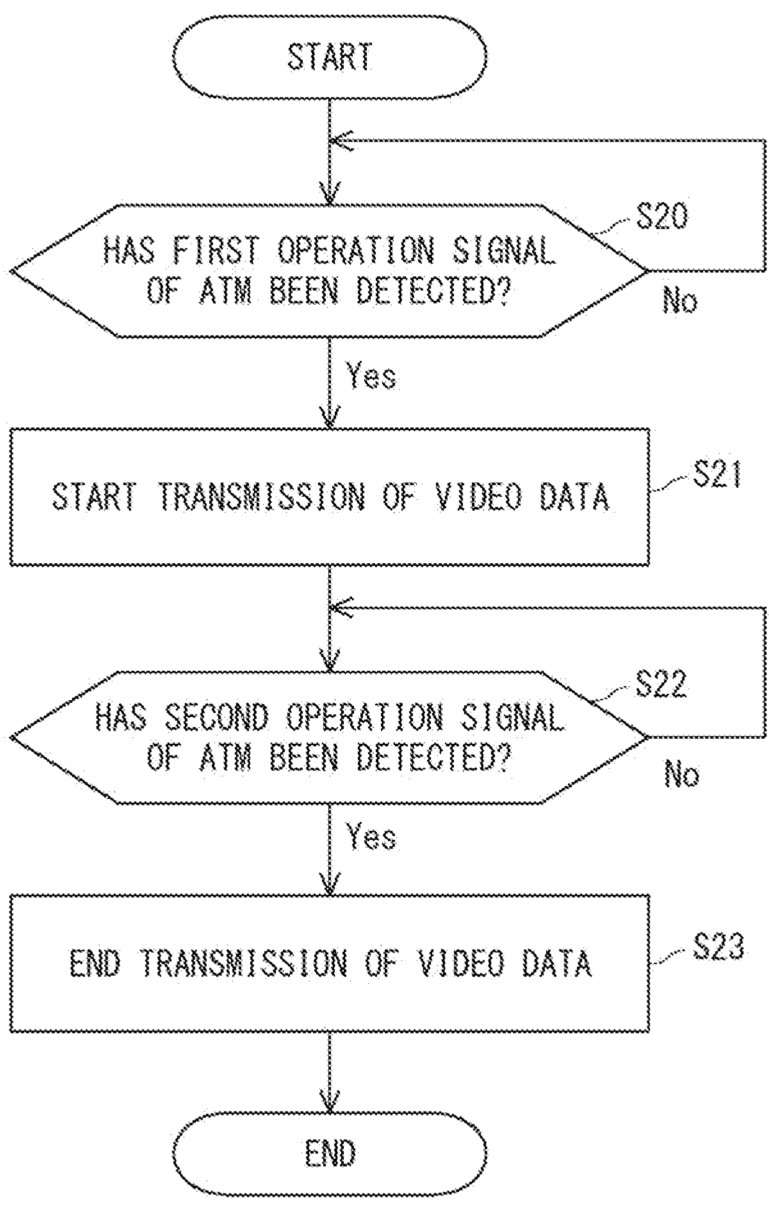
FIG. 6 is a flowchart illustrating a flow of a method for transmitting video data by an ATM according to the second example embodiment.

FIG. 6 is a flowchart illustrating a flow of a video data transmission method by the ATM 110 according to the second example embodiment. First, the control unit 112 of the ATM 110 determines whether a first operation signal related to the first operation of the ATM 110 has been detected (S20). When determining that the first operation signal is detected (Yes in S20), the control unit 112 starts transmission of the video data acquired from camera 150 to server 200 (S21). Meanwhile, when not determining that the first operation signal has been detected (No in S20), the control unit 112 repeats the processing illustrated in S20. Next, the control unit 112 determines whether a second operation signal related to the second operation of the ATM 110 has been detected (S22). When determining that the second operation signal is detected (Yes in S22), the control unit 112 ends the transmission of the video data acquired from camera 150 to server 200 (S23). Meanwhile, when not determining that the second operation signal has been detected (No in S22), the control unit 112 repeats the processing illustrated in S22.

Note that, in the above-described flowchart, the trigger for starting and ending the transmission of the video data is the operation signal of the ATM 110, but example is not limited thereto. For example, the control unit 112 may analyze the video data acquired from the camera 150 to detect triggers of start and end of transmission of the video data. For example, in a case where a body area of a person different from the previous body area is first detected from the video data, the control unit 112 may start transmission of the video data. Furthermore, in a case where the body area of the person first disappears after the body area of the person different from the previous body area is detected from the video data, the control unit 112 may end the transmission of the video data.

As described above, by limiting the transmission period of the video data to a period between the predetermined start trigger and the predetermined end trigger, the amount of communication data can be minimized. In addition, since the call determination processing in the server 200 can be omitted outside the period, calculation resources can be saved.

Figure 7:
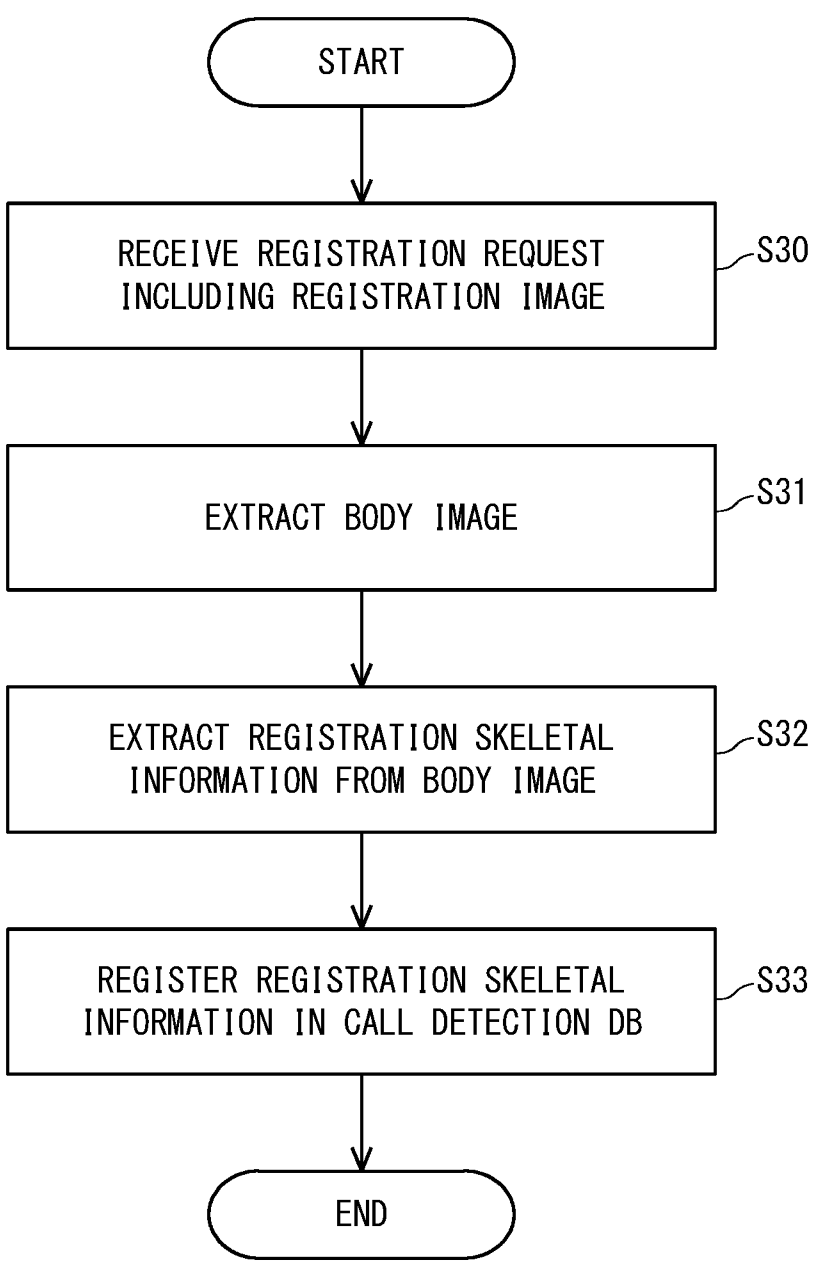
FIG. 7 is a flowchart illustrating a flow of a method of registering a call in a call detection DB by a server according to the second example embodiment.

FIG. 7 is a flowchart illustrating a flow of a registration method in the call detection DB 202 by the server 200 according to the second example embodiment. First, the registration unit 201 of the server 200 receives a registration request including a registration image from a device (not illustrated) that manages bank information (S30). Next, the registration unit 201 supplies the registration image to the call determination unit 204. The call determination unit 204 that has acquired the registration image extracts the body image from the registration image (S31). Next, the call determination unit 204 extracts the registration skeletal information R from the body image (S32). At this time, the call determination unit 204 may set all pieces of skeletal information extracted from the body image as the registration skeletal information R, or may set only some pieces of skeletal information (skeletal information related to, for example, right eye, left eye, head, right hand, and left hand) as the registration skeletal information R. Next, the registration unit 201 acquires the registration skeletal information R from the call determination unit 204, and registers the registration skeletal information R in the call detection DB 202 (S33).

Figure 8:
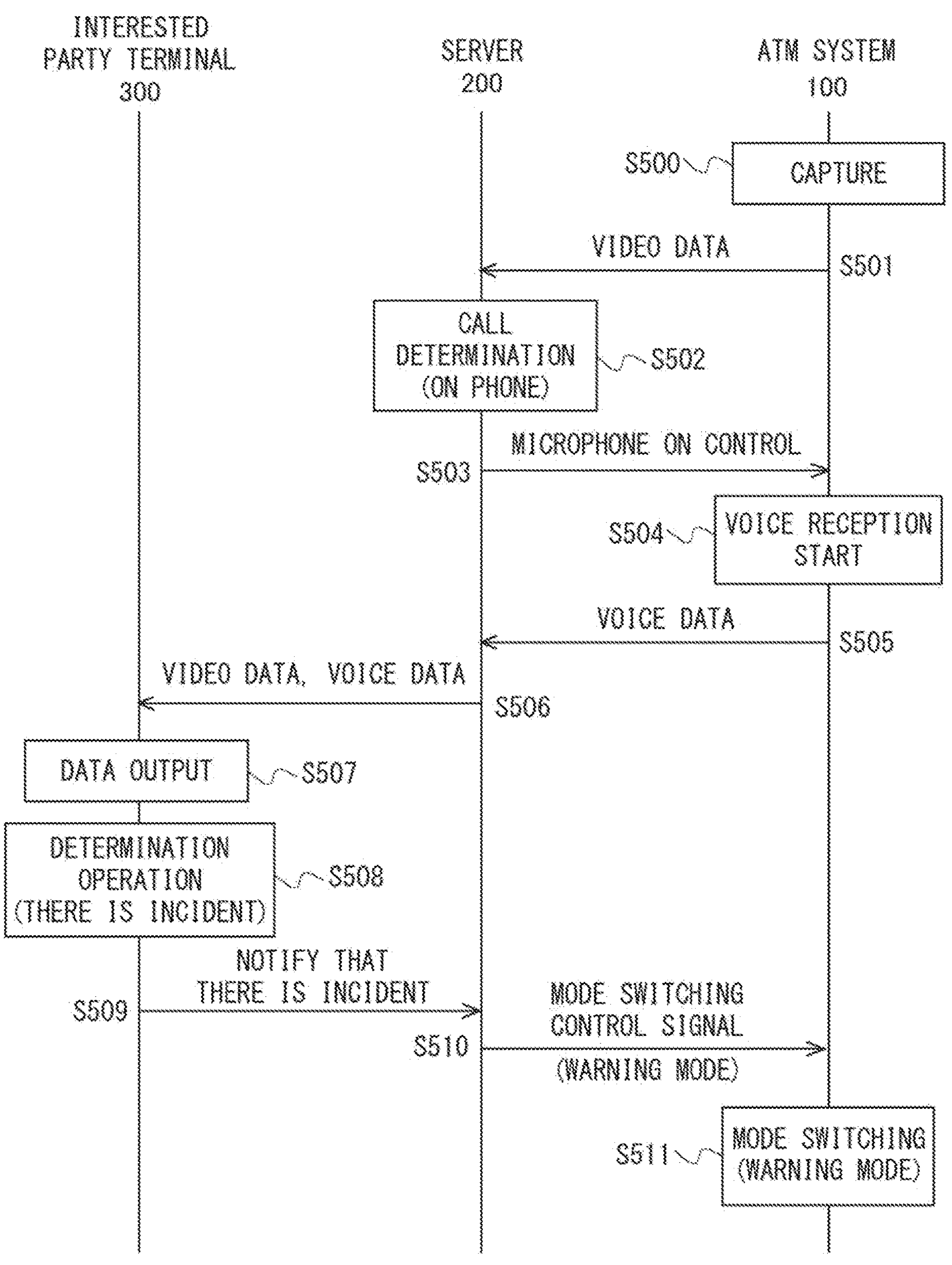
FIG. 8 is a sequence diagram illustrating an example of a flow of incident determination processing according to the second example embodiment.

FIG. 8 is a sequence diagram illustrating an example of a flow of incident determination processing according to the second example embodiment. First, the camera 150 of the ATM system 100 captures the target area (S500). Then, when it is determined that the first operation signal which is a start trigger of the video data transmission is detected, the ATM 110 starts transmitting the video data to the server 200 (S501). As a result, the information acquisition unit 203 of the server 200 starts to acquire the video data.

Next, the call determination unit 204 of the server 200 executes call determination processing (S502). Here, it is assumed that the call determination unit 204 determines that the user U is talking on a phone based on the frame image of the video data. In this case, the operation control unit 205 of the server 200 transmits a microphone on control signal to the ATM 110 (S503). As a result, the ATM 110 activates the microphone 160 and starts acquiring the voice data from the microphone 160 (S504). Then, the ATM 110 starts transmission of the voice data to the server 200 (S505). As a result, the information acquisition unit 203 of the server 200 starts to acquire the voice data.

The server 200 continues to acquire the video data and the voice data until the transmission of the video data by the ATM 110 ends. That is, when detecting the transmission end trigger of the video data, the ATM 110 may end the transmission of the voice data in addition to the transmission of the video data.

Next, the case determination control unit 206 of the server 200 transmits the state-related data acquired from the ATM system 100 to the interested party terminal 300 (S506). In the present example, the state-related data is video data and voice data acquired from the ATM system 100.

Next, the control unit 302 of the interested party terminal 300 outputs the state-related data to the output unit 304 (S507). Specifically, the control unit 302 causes the display unit to display the video data and causes the voice output unit to output the voice data. As a result, the interested party determines whether there is the incident. Next, the input unit 303 of the interested party terminal 300 receives a determination operation by the interested party (S508). Here, it is assumed that the input unit 303 of the interested party terminal 300 receives an input of the determination result indicating presence of the incident from the interested party. In this case, the control unit 302 of the interested party terminal 300 notifies the server 200 that there is the incident as the incident determination result (S509).

The case determination control unit 206 of the server 200 that has received the notification of presence of the incident transmits the mode switching control signal for switching to the warning mode to the ATM 110 of the ATM system 100 (S510). The warning mode is an example of the third operation mode, and is an operation mode for displaying the warning information. As a result, the control unit 112 of the ATM 110 switches the operation mode from the normal mode to the warning mode, and causes the display unit 114 to display predetermined warning information (S511).

Note that, in S510, the case determination control unit 206 may transmit the warning information to the ATM 110 in addition to or instead of the mode switching control signal. Also in this case, in S511, the control unit 112 of the ATM 110 causes the display unit 114 to display predetermined warning information.

Figure 9:
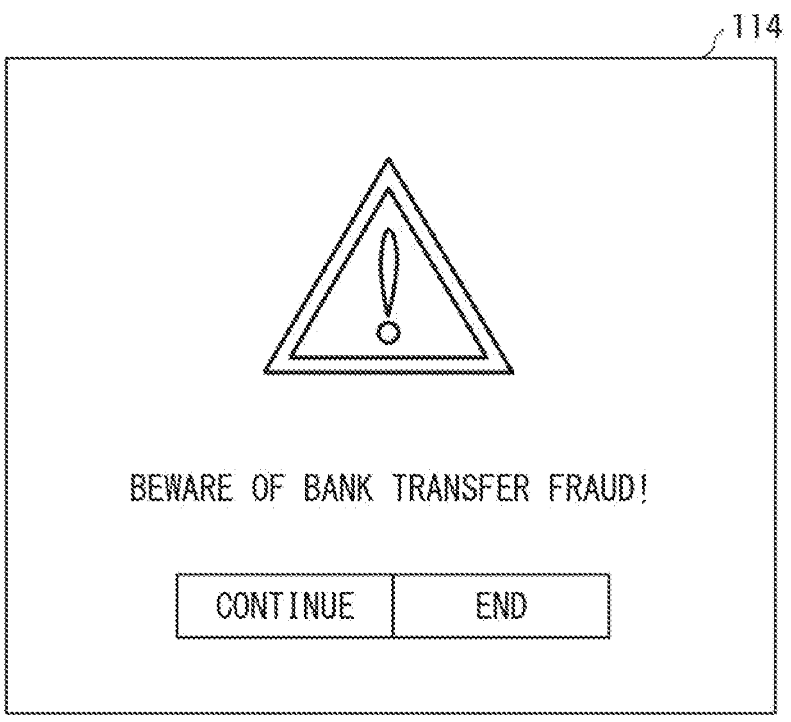
FIG. 9 is a diagram illustrating an example of display on a display unit of the ATM according to the second example embodiment.

FIG. 9 is a diagram illustrating an example of display on the display unit 114 of the ATM 110 according to the second example embodiment. For example, a message "beware of bank transfer fraud!" may be displayed on the display unit 114. Note that a message such as "recently, bank transfer fraud has increased" may be displayed on the display unit 114 instead of the above-described message. In addition, an operation area of "continue" for continuing the normal operation of the ATM 110 and an operation area of "end" for ending the normal operation of the ATM 110 may be displayed on the display unit 114. In a case where the user U views the message and confirms that it is not a bank transfer fraud, the user U selects the operation area of "continue". Meanwhile, in a case of determining that there is a possibility of bank transfer fraud, the user U selects the operation area of "end".

With such a display, it is possible to recognize that the user himself/herself is involved in a bank transfer fraud, and to prevent the bank transfer fraud in advance.

Figure 10:
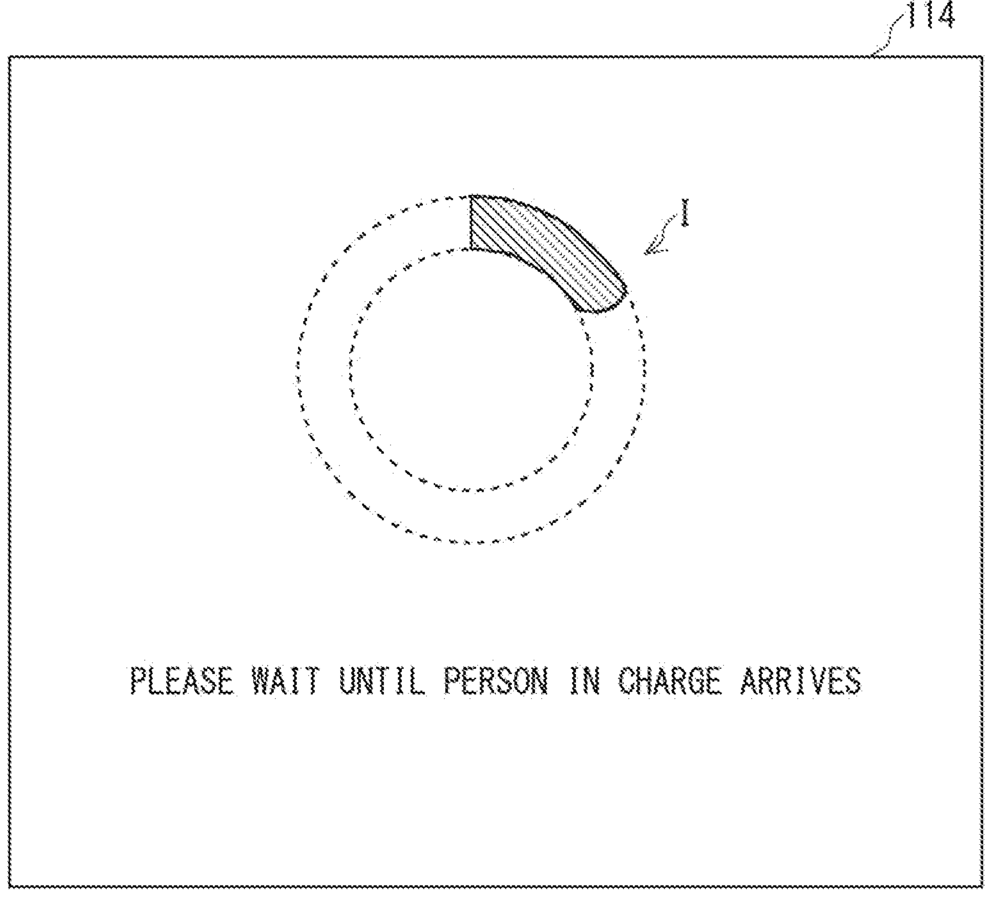
FIG. 10 is a diagram illustrating an example of display on the display unit of the ATM according to the second example embodiment.

FIG. 10 is a diagram illustrating an example of display on the display unit 114 of the ATM 110 according to the second example embodiment. For example, a message "please wait until a person in charge arrives" is displayed on the display unit 114. At this time, the ATM 110 may suspend the normal operation for a predetermined time. By giving the user U a waiting time in this manner, the user U can check whether there is a bank transfer fraud in a calm manner. In addition, by securing the waiting time, a person in charge can respond by rushing to the ATM 110. This makes it possible to prevent the bank transfer fraud in advance.

Note that, for example, an icon I indicating the remaining waiting time may be displayed on the display unit 114. As an example, an icon I indicates the remaining waiting time by the length of the shaded area on the circumference. The shaded area may change such that a circumferential angle decreases with the lapse of time, that is, the length of the shaded area decreases. Furthermore, the icon I may indicate the elapsed time by the length of a dotted line area other than the shaded area on the circumference. By clearly displaying the remaining waiting time in this manner, it is possible to reduce the irritation of the user U.

Figure 11:
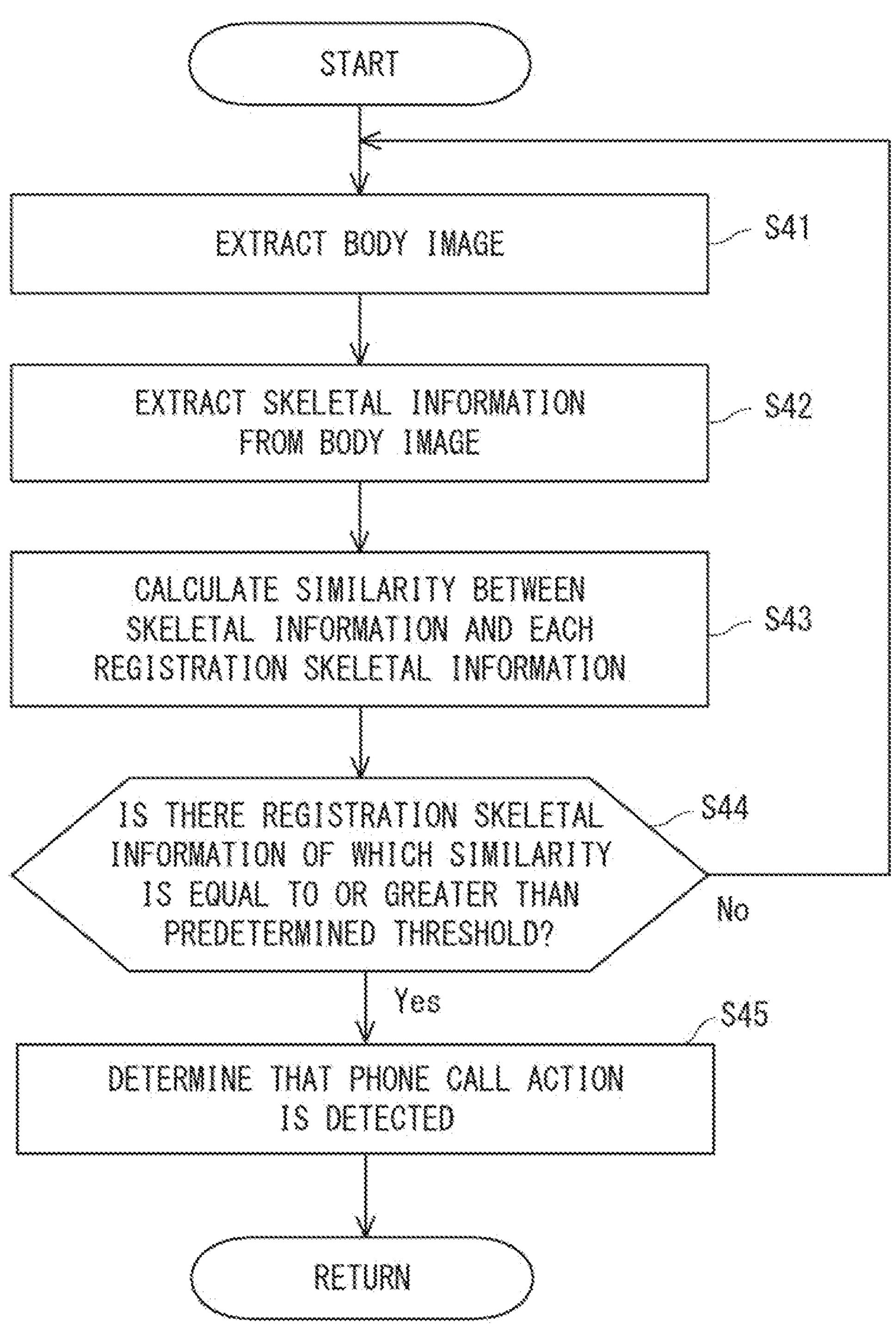
FIG. 11 is a flowchart illustrating a flow of call determination processing by a server according to the second example embodiment.

FIG. 11 is a flowchart illustrating a flow of the call determination processing (processing illustrated in S502 of FIG. 8) by the server 200 according to the second example embodiment. First, when a frame image included in the video data is acquired, the call determination unit 204 detects an image area (body area) of the body of the person from the frame image and extracts the image area as a body image (S41). The extracting may be cutting out.

Next, the call determination unit 204 extracts the skeletal information from the body image (S42). At this time, the call determination unit 204 may extract skeletal information of at least a part of the body of the person based on features such as joints of the person recognized in the body image using a skeleton estimation technique using machine learning. The call determination unit 204 may use, for example, a skeleton estimation technique such as OpenPose.

Next, the call determination unit 204 calculates similarity between the extracted skeletal information and each the registration skeletal information R registered in the call detection DB 202 (S43). Instead of the similarity, the calculation target may be the similarity between a part of the extracted skeletal information and each the registration skeletal information R or the similarity between the extracted skeletal information and a part of each the registration skeletal information R. Furthermore, the call determination unit 204 may calculate the similarity described above by directly using the skeletal information or indirectly using the skeletal information. For example, the call determination unit 204 may convert at least a part of the extracted skeletal information and at least a part of each registration skeletal information R registered in the call detection DB 202 into another format, and calculate the similarity between the converted information to calculate the similarity. In this case, the similarity described above may be the similarity itself between the converted information, or may be a value calculated using the similarity between the converted information. The conversion method may be normalization of the size of the skeletal information, conversion into a feature amount using an angle (that is, the degree of bending of the joint) formed by each bone, or conversion into three-dimensional posture information based on a model of machine learning learned in advance.

Next, the call determination unit 204 determines whether there is registration skeletal information R of which the similarity is equal to or greater than a predetermined threshold (S44). When there is the registration skeletal information R of which the similarity is equal to or greater than the predetermined threshold (Yes in S44), the call determination unit 204 determines that the phone call action is detected (S45). Then, the server 200 advances the processing to S503 of FIG. 8. Meanwhile, when there is no registration skeletal information R of which the similarity is equal to or greater than the predetermined threshold (No in S44), the call determination unit 204 returns the processing to S41 without determining that the phone call action is detected.

Note that S44 to S45 may be specifically as follows. For example, first, the call determination unit 204 specifies the number of pieces of registration skeletal information R of which the calculated similarity is equal to or greater than a predetermined threshold. Then, the call determination unit 204 determines whether the phone call action has been detected based on the number of corresponding pieces of registration skeletal information R. In the second example embodiment, the call determination unit 204 determines that the phone call action is detected in a case where there is at least one piece of the registration skeletal information R of which the similarity is equal to or greater than the predetermined threshold, and does not determine that the phone call action is detected in a case where there is no registration skeletal information R of which the similarity is equal to or greater than the predetermined threshold. Alternatively, however, the call determination unit 204 may determine that the phone call action has been detected in a case where the number of pieces of the registration skeletal information R of which the similarity is equal to or greater than the predetermined threshold is equal to or greater than the predetermined number, and may not determine that the phone call action has been detected in a case where the number of pieces of the registration skeletal information R of which the similarity is equal to or greater than the predetermined threshold is less than the predetermined number.

As described above, according to second example embodiment, the server 200 additionally collects the personal voice data of the user U suggesting the talk content when the user U who has visited the ATM 110 is talking on the phone, and acquires the incident determination result from the collected information. This can contribute to the prevention of the occurrence of the case or the quick resolution. Since the personal voice data of the user U is not additionally collected in a case where the user U is not talking on the phone, an increase in the psychological burden on the user U can be suppressed. In addition, the server 200 grasps the presence or absence of the incident, so that the server 200 or the interested party can take a response according to the presence or absence of the incident. Therefore, it is possible to avoid an unpleasant situation in which attention is attracted in a case where the user U is executing a transaction without an incident. This also makes it possible to suppress an increase in the psychological burden on the user U.

Note that the second example embodiment can be modified as follows.

For example, in the above description, the determination of the presence or absence of the incident is performed by the interested party, but may be performed by the server 200. As an example, the case determination control unit 206 of the server 200 may estimate the talk content based on the voice data. Voice recognition may be used to estimate the talk content. Then, the case determination control unit 206 may determine the presence or absence of an incident based on the frame image of the video data and the talk content. As an example, in a case where the phone call action is detected from the video data, and a specific word, phrase, or vocabulary is included in the voice data, the case determination control unit 206 may determine that there is an incident. Note that, in this case, the processing illustrated in S506 to S509 of FIG. 8 may be omitted. As a result, it is not necessary to arrange the interested party involved for determining the presence or absence of the incident, and human cost can be reduced.

In the above description, the ATM 110 starts or ends the transmission by the start trigger and the end trigger of the transmission of the video data of the camera 150, but may start and end regardless of such a trigger. For example, the ATM 110 may transmit the video data of the camera 150 to the server 200 constantly or at predetermined time intervals throughout the day or during business hours.

Furthermore, in the above description, the operation control unit 205 activates the microphone 160 in a case where it is determined that the user U is talking on the phone. Alternatively, however, the microphone 160 may be active throughout the day or during business hours. In this case, the operation control unit 205 may start receiving the voice data by requesting the ATM 110 to transmit the voice data.

In addition, in the above description, the incident determination result is the determination result of the presence or absence of an incident inputted to the interested party terminal 300, or the notification transmitted from the interested party terminal 300 in a case where there is an incident. However, instead of or in addition to this, the incident determination result may be an instruction for switching to the third operation mode corresponding to presence of an incident. Therefore, by receiving the above instruction, the case determination control unit 206 of the server 200 can recognize that the determination result that there is an incident is obtained. In this case, the interested party does not need to input the presence or absence of the incident, and can realize the switching of the appropriate operation mode according to the specific situation estimated from the video data and the voice data.

Furthermore, in S506 of FIG. 8 described above, in a case where the state-related data is transmitted to the interested party terminal 300, the case determination control unit 206 may also transmit the user information regarding the user U to the interested party terminal 300. The user information is attribute information of the user U. The user information may include, for example, information of a holder read from a passbook or a cash card, or a name, gender, age, past transaction history, or other attribute information of the holder associated with an account number read from the passbook or the cash card. As a result, it is possible to easily determine the presence or absence of the incident of the interested party. For example, in a case where the interested party can be clearly recognized as a different person by comparing information of gender and age with the video data, it can be determined that there is a high possibility of having an incident. Furthermore, for example, in a case where the interested party can grasp that the interested party has been defrauded in the past from the user information, the interested party can be determined to have a high possibility of having an incident. Furthermore, for example, in a case where the interested party can grasp that the user is an elderly person from the user information, the interested party can carefully determine that there is no incident. This is because there is a tendency that there are many elderly people as victims of fraud.

In addition, in S506 of FIG. 8 described above, the case determination control unit 206 of the server 200 transmits both the video data and the voice data to the interested party terminal 300 as the state-related data. However, in a case where the talk content can be sufficiently known from the voice data, the case determination control unit 206 may omit the video data from the state-related data. Here, since the voice data includes privacy information called the talk content, there is a case where the voice data has higher confidentiality than the video data. Therefore, even in such a case, since collection of information with high confidentiality is not performed when the call determination is negative, it is possible to achieve an effect of contributing to prevention of occurrence of the case or quick resolution while suppressing an increase in a psychological burden on the user.

Third Example Embodiment

Figure 12:
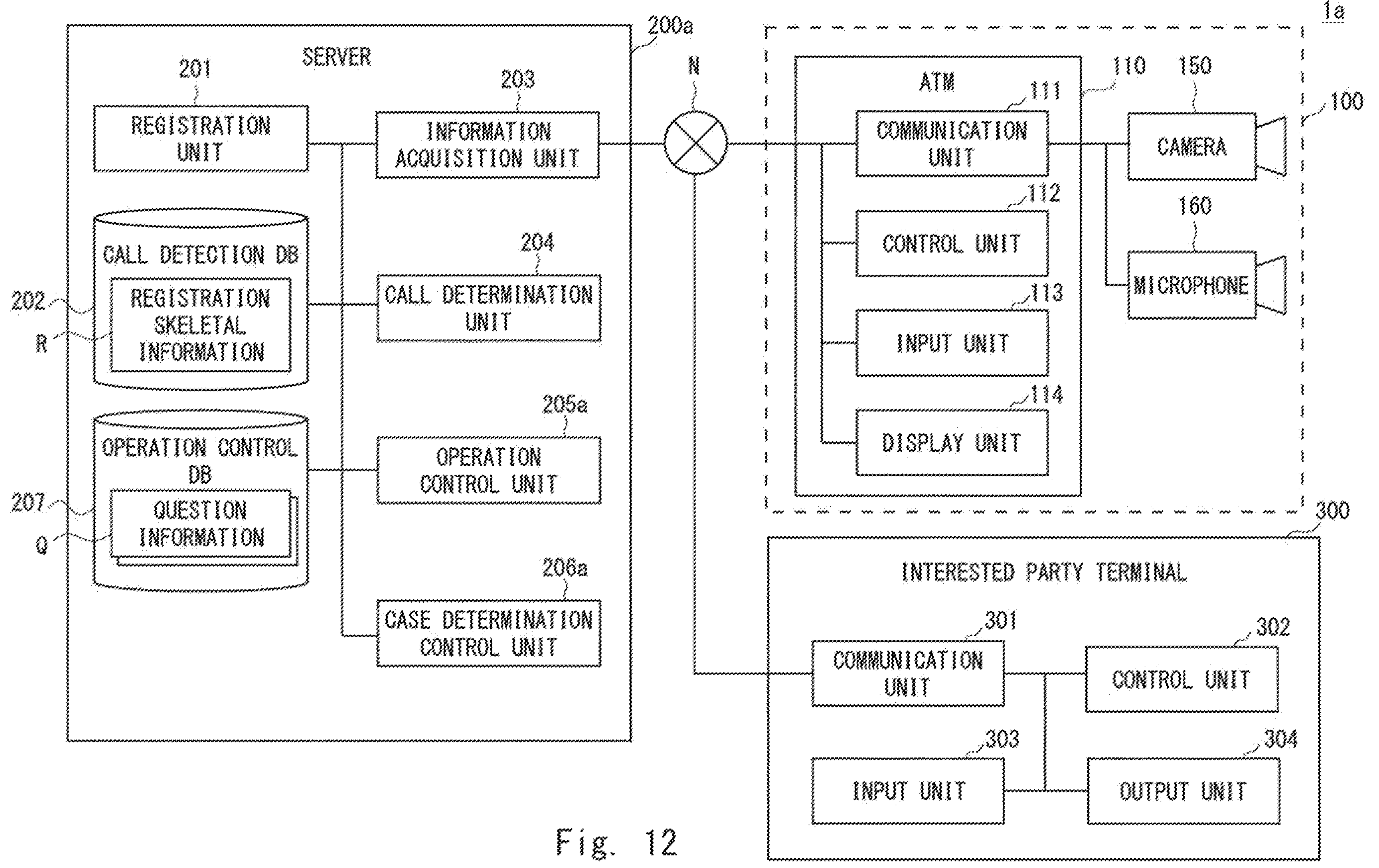
FIG. 12 is a block diagram illustrating an overall configuration of an information processing system according to a third example embodiment.

Next, a third example embodiment of the present disclosure will be described. FIG. 12 is a block diagram illustrating an overall configuration of an information processing system 1*a* according to the third example embodiment. The information processing system 1*a* according to the third example embodiment is characterized by automatically switching the operation mode of the ATM 110 when the phone call action is detected.

The information processing system 1*a* includes a server 200*a* instead of the server 200.

The server 200*a* includes an operation control unit 205*a* instead of the operation control unit 205, a case determination control unit 206*a* instead of the case determination control unit 206, and an operation control DB 207.

When it is determined that the user U is talking on a phone, the operation control unit 205*a* performs control for switching the operation mode of the ATM 110 to the second operation mode instead of the control for activating the microphone 160. Specifically, the operation control unit 205*a* transmits a mode switching control signal for switching to the second operation mode to the ATM 110. The second operation mode is an operation mode for executing an operation different from a normal operation. The second operation mode may perform an operation different from the third operation mode described above.

Here, the operation in the second operation mode is performed for the purpose of calming the user U or securing a time until the interested party or the police arrives at the ATM 110. In addition to or in place of this, the operation in the second operation mode is performed for the purpose of facilitating determination of the presence or absence of an incident. Specifically, the operation in the second operation mode may include interrupting the transfer processing performed in the normal mode and causing the display unit 114 or the voice output unit of the ATM 110 to output information at least partially different from the information output in the normal mode.

In the third example embodiment, as an example, the operation in the second operation mode may include displaying question information related to transfer on the display unit 114 and receiving an answer via the input unit 113. Specifically, first, in a case where it is determined that the user U is talking on a phone, the operation control unit 205*a* reads out at least one of pieces of question information Q stored in the operation control DB 207. Then, the operation control unit 205*a* transmits a mode switching control signal including the read question information Q to the ATM 110 via the network N. The ATM 110 that has received the mode switching control signal switches the operation mode to the second operation mode. Then, in the second operation mode, the ATM 110 displays the question information Q included in the mode switching control signal, receives an answer from the user information U, and transmits answer information which is information related to the answer to the server 200*a*. As described above, in the second operation mode, the operation control unit 205*a* causes the ATM 110 to output the question information Q stored in advance in the operation control DB 207.

The operation control DB 207 is a storage device that stores one or a plurality of pieces of question information Q registered in advance.

The case determination control unit 206*a* basically has a function similar to that of the case determination control unit 206, but further uses a response to the question information to acquire the incident determination result. The response may be at least one of answer information to the question information and video data representing the reaction of the user U when the question information is output (that is, a predetermined period after switching of the second operation mode). The answer information is an example of data directly suggesting the state of the user. When the response is the answer information, the case determination control unit 206*a* uses the answer information in addition to the first data (in the second and third example embodiments, frame image of video data) as the state-related data for the determination of the presence or absence of an incident. It is possible to facilitate the incident determination by adding the answer information to the basis of the incident determination. In addition, the accuracy of the incident determination can be improved. When the response is the video data indicating the reaction of the user U, the case determination control unit 206*a* may include the video data of the predetermined period before the switching of the second operation mode in the state-related data in addition to the video data of the predetermined period after the switching of the second operation mode. However, the video data of the predetermined period before the switching of the second operation mode may be omitted. Hereinafter, such a predetermined period based on the switching of the second operation mode may be referred to as a target period.

In addition, the second data (voice data in the second example embodiment) may be omitted from the basis of the incident determination.

Figure 13:
FIG. 13 is a diagram illustrating an example of a data structure of an operation control DB according to a third example embodiment.

FIG. 13 is a diagram illustrating an example of a data structure of the operation control DB 207 according to third example embodiment. The operation control DB 207 stores four pieces of question information Q1 to Q4. Note that the number of pieces of the question information Q is not limited to four.

The question information Q1 is a question with the contents of "has this account been transferred in the past?" The question information Q2 is a question with the contents of "has a phone call from an unknown phone number been received and transferred?" The question information Q3 is a question with the contents of "are you performing this operation since you heard that you can be given money?". The question information Q4 is a question with the contents of "did you check or consult with your family or acquaintances?".

The operation control unit 205*a* may select one question information Q from the question information Q1 to Q4 in a predetermined order or randomly and transmit the selected question information Q to the ATM 110. Then, the operation control unit 205*a* that has received the answer information may repeat the above selection and transmission for a predetermined number of times or until a predetermined time has elapsed from the interruption of the transfer processing. Alternatively, the selection and transmission may not be repeated.

Alternatively, the operation control unit 205*a* may read a predetermined number or all of pieces of the question information Q among the question information Q included in the operation control DB 207 and transmit the plurality of pieces of read question information Q to the ATM 110. In this case, the ATM 110 may display the received question information Q on the display unit 114 in a predetermined order or randomly. Then, the ATM 110 may sequentially transmit the received answer information to the server 200 or collectively transmit the received answer information to the server 200.

Figure 14:
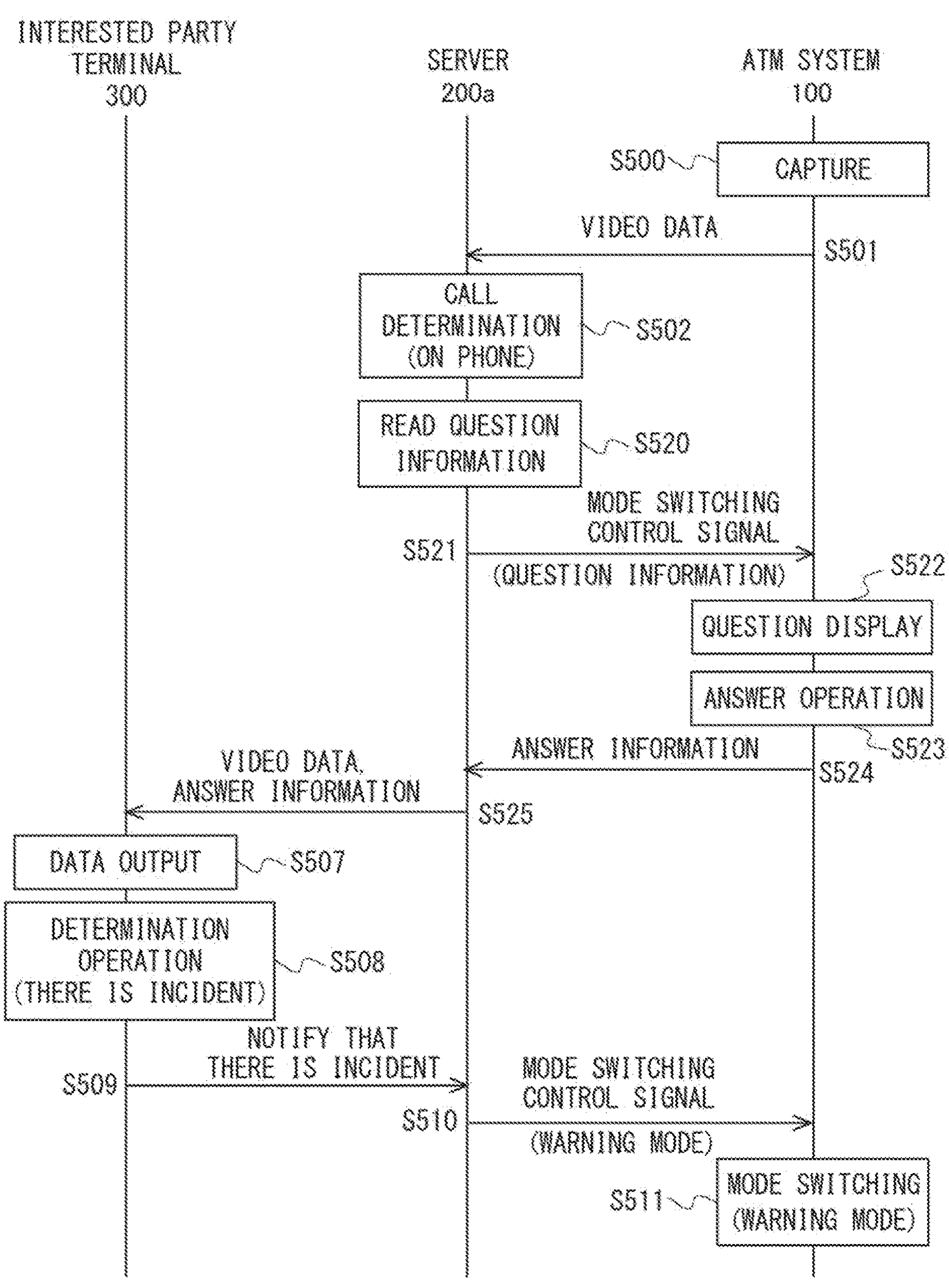
FIG. 14 is a sequence diagram illustrating an example of a flow of incident determination processing according to the third example embodiment.

FIG. 14 is a sequence diagram illustrating an example of a flow of incident determination processing according to third example embodiment. First, the information processing system 1*a* executes processing similar to S500 to S502 in FIG. 8. Here, it is assumed that the call determination unit 204 determines that the user U is talking on a phone from the frame image of the video data. In this case, the operation control unit 205*a* of the server 200 selects the question information Q from the operation control DB 207 and reads the selected question information Q (S520). Then, the operation control unit 205*a* transmits a mode switching control signal including the read question information Q to the ATM 110 of the ATM system 100 via the network N (S521).

Next, the ATM 110 switches the operation mode to the second operation mode, and displays the question information Q included in the mode switching control signal on the display unit 114 (S522). Then, the ATM 110 receives an answer operation from the user U via the input unit 113 (S523). Next, the ATM 110 transmits the answer information to the server 200*a* (S524).

The case determination control unit 206*a* of the server 200*a* transmits the video data and the answer information acquired from the ATM system 100 to the interested party terminal 300 (S525). At this time, the case determination control unit 206*a* may also transmit the question information Q corresponding to the answer information to the interested party terminal 300. Then, the information processing system 1*a* executes processing similar to S507 to S511. Note that, in S507, the control unit 302 of the interested party terminal 300 outputs the video data and the answer information as the state-related data to the output unit 304, and the interested party determines the presence or absence of an incident based on the output data.

Note that the state-related data output (S522 to S524 and S507) by the interested party terminal 300 may be repeatedly performed from the display of the question information by the ATM 110, and a case determination operation (S508) may be performed in the middle of the repetition. In addition, the case determination control unit 206*a* of the server 200*a* may request the ATM 110 to end the output of the question information Q in a case where the case determination operation is performed in the middle of repetition. For example, in a case where there is no incident, the case determination control unit 206*a* of the server 200*a* may transmit a mode switching control signal instructing to return from the second operation mode to the normal mode to the ATM 110.

Furthermore, for example, in a case where there is an incident, the case determination control unit 206*a* of the server 200*a* may transmit a mode switching control signal instructing to shift from the second operation mode to the third operation mode to the ATM 110.

Figure 15:
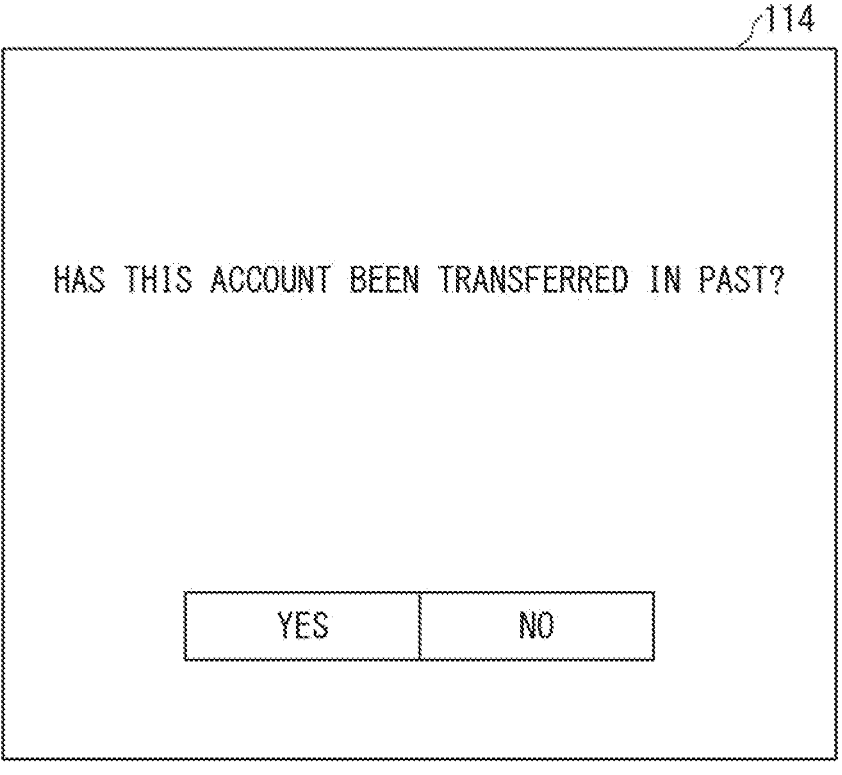
FIG. 15 is a diagram illustrating an example of display on a display unit of the ATM according to the third example embodiment.

FIG. 15 is a diagram illustrating an example of display on the display unit 114 of the ATM 110 according to third example embodiment. This drawing is displayed in S522 of FIG. 14. For example, a message "has this account been transferred in the past?" indicating the question information Q1 may be displayed on the display unit 114. In addition, the display unit 114 may display operation areas indicating options of "Yes" and "No". The user U browses the message and performs an operation to select "Yes" or "No". The selected option is the answer information.

As described above, according to the third example embodiment, when the phone call action is detected, the server 200*a* automatically switches the operation mode of the ATM 110 to interrupt the transfer processing, and outputs information different from the transfer processing. As a result, it is possible to calm the user U or secure the time until the interested party or the police arrives at the ATM 110. In addition, in a case where the server 200*a* operates the ATM 110 to output the question information Q, it is possible to easily determine the presence or absence of an incident by the answer information in addition to securing time. In addition, erroneous determination can be prevented. Therefore, it is possible to achieve an effect of contributing to the prevention of the occurrence of the case or the quick resolution while suppressing the increase in the psychological burden on the user.

Note that the third example embodiment can be modified as follows.

First Modified Example of Third Example Embodiment

For example, in the above description, the second data (voice data in the second example embodiment) may be omitted from the basis of the incident nature determination, but the second data may also be included in the basis of the incident nature determination.

Figure 16:
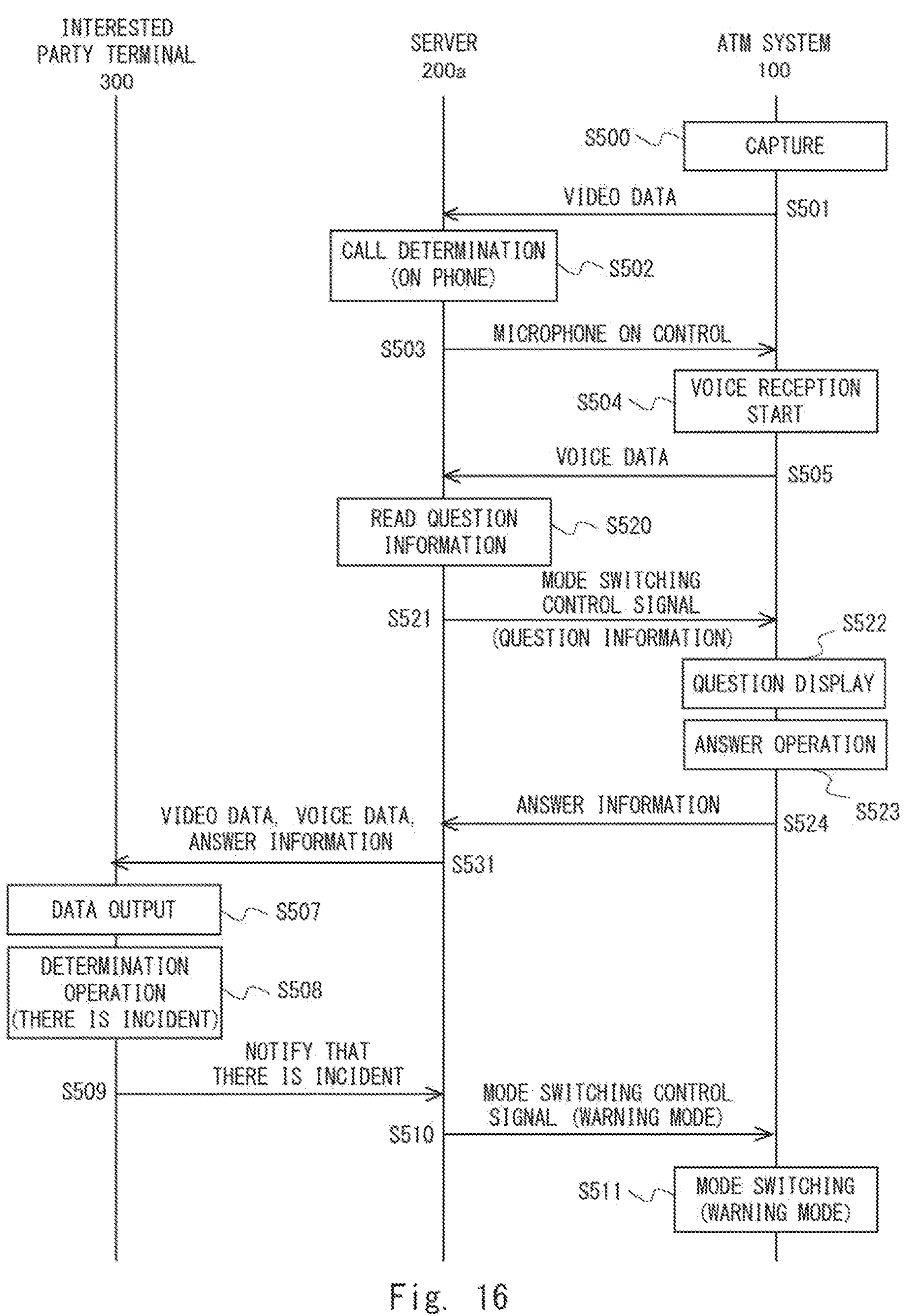
FIG. 16 is a sequence diagram illustrating an example of a flow of incident determination processing according to a first modified example of the third 10 example embodiment.

FIG. 16 is a sequence diagram illustrating an example of a flow of incident determination processing according to the first modified example of the third example embodiment. The step of FIG. 16 is different from the step of FIG. 14 in including S503 to S505 and S531 instead of S525 of FIG. 14.

Specifically, when the call determination unit 204 of the server 200*a* determines that the user U is calling from the frame image of the video data (S502), the operation control unit 205*a* transmits the microphone on control signal to the ATM 110 (S503). As a result, the ATM 110 activates the microphone 160 and starts acquiring the voice data from the microphone 160 (S504). Then, the ATM 110 starts transmission of the voice data to the server 200 (S505). Then, the information processing system 1*a* executes processing similar to S520 to S524.

The case determination control unit 206*a* of the server 200*a* transmits the video data in the target period acquired from the ATM system 100, the voice data in the predetermined period after the microphone on control, and the answer information to the interested party terminal 300 as the state-related data (S531). Then, the information processing system 1*a* executes processing similar to S507 to S511. Note that, in S507, the control unit 302 of the interested party terminal 300 outputs the video data, the voice data, and the answer information to the output unit 304, and the interested party determines the presence or absence of an incident based on the output data.

As a result, it is possible to more easily determine the presence or absence of an incident. In addition, erroneous determination can be further prevented. Therefore, it is possible to achieve an effect of contributing to the prevention of the occurrence of the case or the quick resolution while suppressing the increase in the psychological burden on the user.

Second Modified Example of Third Example Embodiment

In addition, in the above description, one of the interested party terminal 300 and the server 200*a* determines the presence or absence of an incident, but both the interested party terminal 300 and the server 200*a* may determine the presence or absence of an incident. Specifically, the case determination control unit 206*a* of the server 200*a* executes the primary determination on the presence or absence of the incident, and the interested party terminal 300 executes the secondary determination on the presence or absence of an incident.

More specifically, the case determination control unit 206*a* of the server 200*a* executes the primary determination based on at least a response to the question information. In a case where the result of the primary determination indicates presence of an incident, the case determination control unit 206*a* transmits the video data in the target period and the voice data in the predetermined period after the microphone on control to the interested party terminal 300 as the state-related data. At this time, the case determination control unit 206*a* may include answer information or answer information and question information Q corresponding thereto in the state-related data. Then, the case determination control unit 206*a* receives the incident determination result input to the interested party terminal 300 from the interested party terminal 300.

Figure 17:
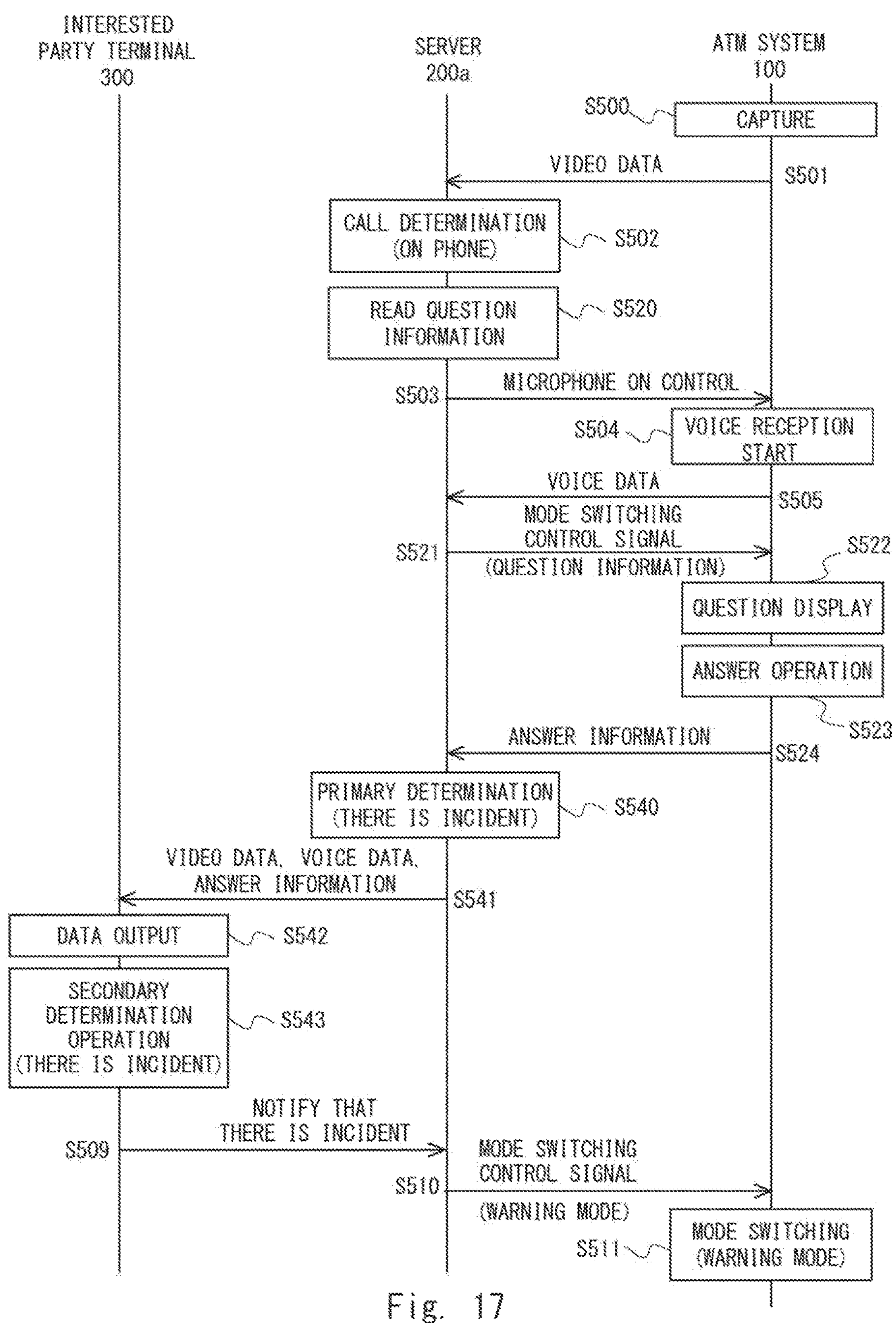
FIG. 17 is a sequence diagram illustrating an example of a flow of incident determination processing according to a second modified example of the third example embodiment.

FIG. 17 is a sequence diagram illustrating an example of a flow of incident determination processing according to the second modified example of the third example embodiment. The step of FIG. 17 is different from the step of FIG. 16 in including S540 to S543 instead of S531 and S507 to S508 of FIG. 16.

Specifically, when the case determination control unit 206*a* of the server 200*a* acquires the answer information from the ATM 110 (S524), the primary determination is performed based on at least the answer information (S540). For example, in a case where the user U answers to the question information Q with a high possibility of having an incident, the case determination control unit 206*a* may determine that there is an incident in the primary determination. The answer having a high possibility of having an incident may be determined in advance. Furthermore, for example, the case determination control unit 206*a* may determine that there is an incident in the primary determination in a case where the number of times of making an answer having a high possibility of having an incident is a predetermined number of times or more.

In addition, the importance of determining the presence or absence of an incident may be different for each content of the question information Q. When the answer information is obtained for the question information Q with low importance, it is necessary to cause the ATM 110 to output further question information Q to obtain the answer information in order to determine the presence or absence of an incident. However, in a case where answer information is obtained for the question information Q with high importance, it is possible to sufficiently determine the presence or absence of an incident by using the already obtained answer information. Therefore, for example, the case determination control unit 206*a* may determine that there is an incident or there is no incident in the primary determination in a case where the user information U gives an answer with high possibility or low possibility that there is an incident to the question information Q with high importance.

When it is determined that there is an incident in the primary determination, the case determination control unit 206*a* of the server 200*a* transmits the acquired video data, voice data, and answer information to the interested party terminal 300 as state-related data (S541). Note that the case determination control unit 206*a* may not transmit the state-related data to the interested party terminal 300 in a case where it is determined that there is no incident in the primary determination.

Next, the control unit 302 of the interested party terminal 300 outputs the acquired state-related data to the output unit 304 (S542). As a result, the interested party makes a secondary determination as to whether there is an incident. Next, the input unit 303 of the interested party terminal 300 receives the secondary determination operation by the interested party (S543). Here, it is assumed that the input unit 303 of the interested party terminal 300 receives an input of a secondary determination result indicating an incident from the interested party. In this case, the control unit 302 of the interested party terminal 300 notifies the server 200 that there is the incident as the incident determination result (S509). Then, the information processing system 1*a* executes processing similar to S510 to S511.

As a result, in a case where there is no incident in the primary determination, the secondary determination by the interested party is omitted, so that the monitoring burden on the interested party can be reduced. Therefore, overlooking can be prevented when the possibility of the case is high. Note that, even in a case where there is no incident in the primary determination, the case determination control unit 206*a* of the server 200*a* may transmit various data to the interested party terminal 300. Then, the interested party terminal 300 may execute the secondary determination. This also enables the interested party to monitor with sharpness in consideration of the result of the primary determination, so that the monitoring load can be reduced. Therefore, overlooking can be prevented when the possibility of the case is high.

Other Modified Examples of Third Example Embodiment

In a case where the operation in the third operation mode includes an operation for securing time, the operation may be an operation of delaying the operation of the ATM 110 as compared with a normal operation, or may be an operation of continuing the output of the question information.

In the third example embodiment, the frame image of the video data is used as the first data. Alternatively, the frame image may be voice data or received radio wave data indicating that the radio wave of the mobile phone is detected. When the server 200*a* acquires the second data, the second data may be at least one of frame image and voice data of video data, and may be data of a type different from that of the first data.

Fourth Example Embodiment

Next, a fourth example embodiment of the present disclosure will be described. The fourth example embodiment can be described as outlines of fifth to seventh example embodiments described below. In the fourth example embodiment, the determination of the presence or absence of an incident is optimized by changing the operation content of the second operation mode according to the determination result of the presence or absence of the incident. To optimize the determination of the presence or absence of the incident may be to accelerate the determination of the presence or absence of the incident or to improve the determination accuracy.

Figure 18:
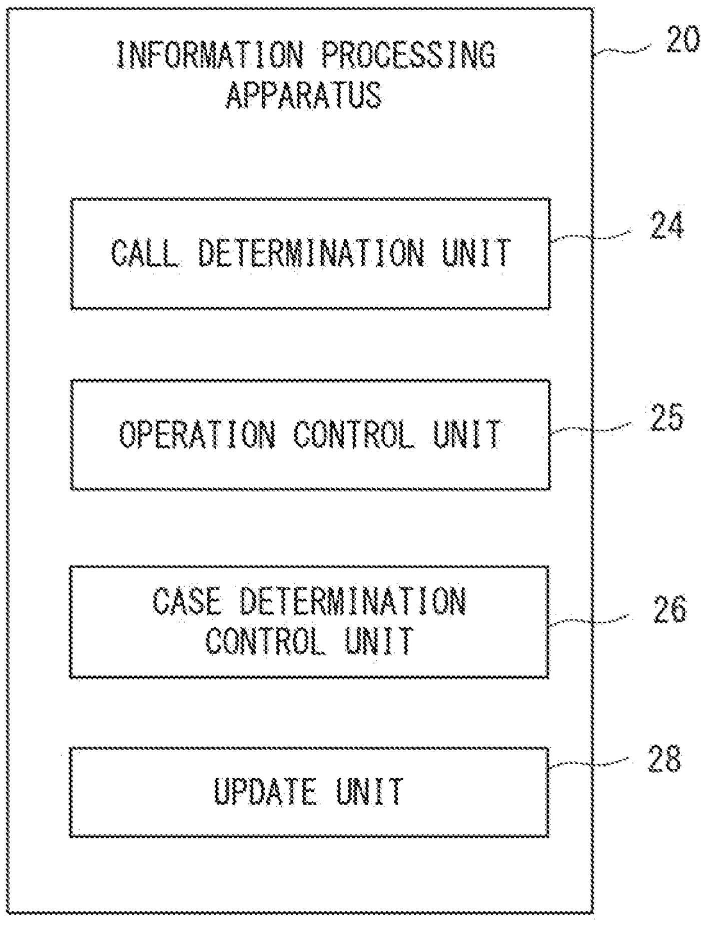
FIG. 18 is a block diagram illustrating a configuration of an information processing apparatus according to a fourth example embodiment.

FIG. 18 is a block diagram illustrating a configuration of an information processing apparatus 20 according to fourth example embodiment. Similarly to the information processing apparatus 10, the information processing apparatus 20 is a computer system that detects the incident event related to the ATM. The information processing apparatus 20 includes a call determination unit 24, an operation control unit 25, a case determination control unit 26, and an update unit 28.

The call determination unit 24 is also referred to as call determination means. The call determination unit 24 determines whether the user who has visited the ATM is talking on a phone. At this time, the call determination unit 24 may perform the call determination based on at least one of the signal data of the captured image, the voice data, and the received radio wave data of the target area. However, the data on which the call determination is based is not limited thereto.

The operation control unit 25 is also referred to as operation control means. When determining that the user is talking on a phone, the operation control unit 25 switches the operation mode of the ATM from the normal operation mode to the second operation mode. The second operation mode is basically similar to the second operation mode described in the above example embodiment. However, the second operation mode in the fourth example embodiment may be an operation mode intended to collect state-related data for facilitating determination of the presence or absence of the incident.

The case determination control unit 26 is also referred to as case determination control means. The case determination control unit 26 transmits the state-related data suggesting the state of the user in the target period to the interested party terminal, and acquires the incident determination result from the interested party terminal. The target period is determined based on switching to the second operation mode. Here, in the fourth example embodiment, the target period includes at least a predetermined period after switching. For example, the target period may be a predetermined period after the switching, or may be a predetermined period before and after the switching across the switching. Further, the state-related data in the target period is data directly or indirectly suggesting the state of the user in the target period, and may be at least one of a captured image, voice, and ATM operation content.

The update unit 28 is also referred to as update means. The update unit 28 changes the operation content of the second operation mode based on at least the incident determination result. For example, the update unit 28 analyzes a feature of the state-related data, which is considered to be highly important to the determination result, based on at least the incident determination result and the state-related data. The high importance may mean that the importance is a predetermined threshold or more. Then, in order to suitably collect the analyzed state-related data having the feature with high importance, the update unit 28 changes the operation content of the second operation mode to the operation content related to the feature. The preferable collection may be collection in a short time or collection of state-related data that enables accurate extraction of the feature.

Figure 19:
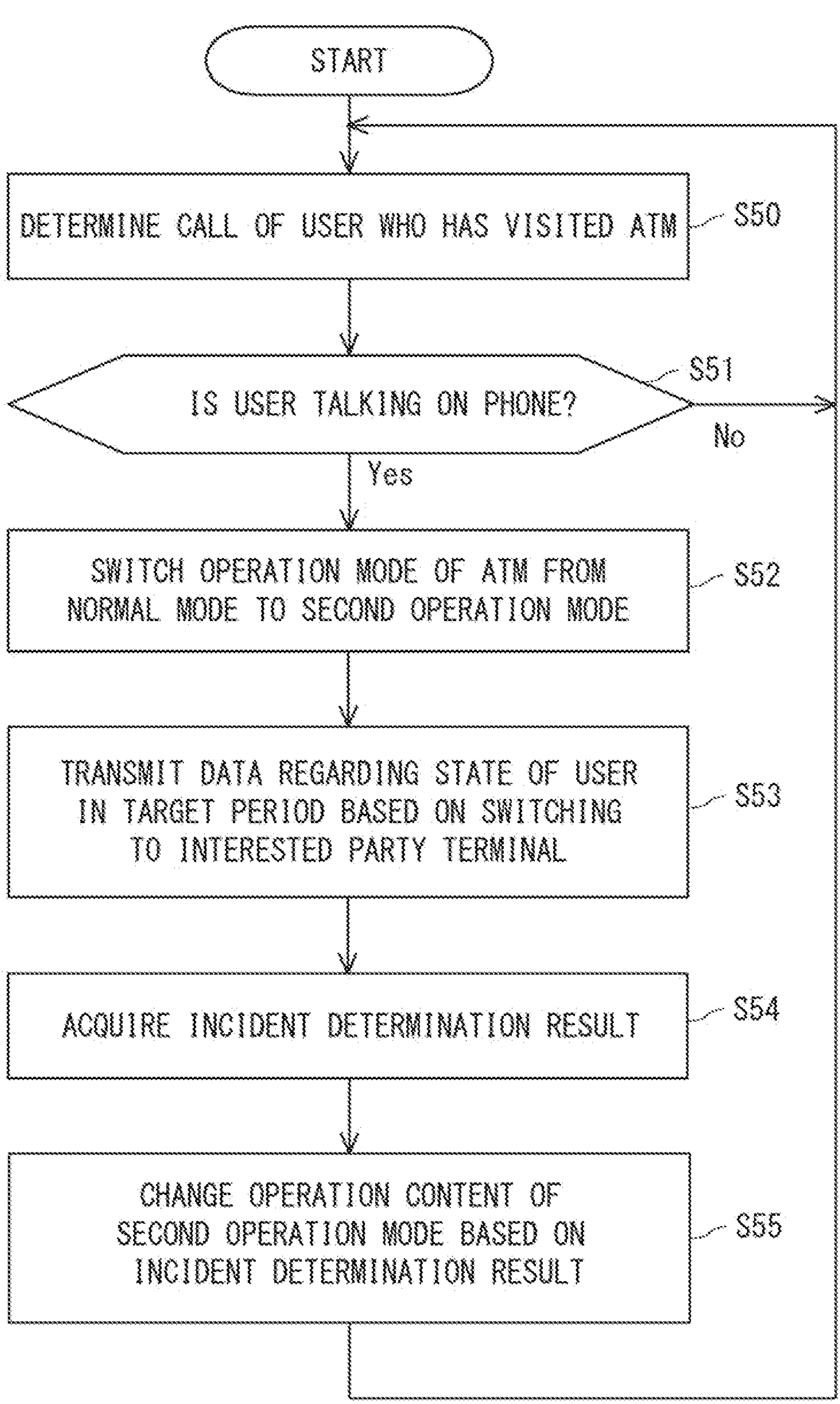
FIG. 19 is a flowchart illustrating a flow of an information processing method according to the fourth example embodiment.

FIG. 19 is a flowchart illustrating a flow of an information processing method according to fourth example embodiment. First, the call determination unit 24 of the information processing apparatus 20 determines the call of the user who has visited the ATM (S50). When the user is not talking on the phone (No in S51), the call determination unit 24 repeats the processing illustrated in S50. Meanwhile, when the user is talking on the phone (Yes in S51), the operation control unit 25 switches the operation mode of the ATM from the normal mode to the second operation mode (S52). Next, the case determination control unit 26 transmits the state-related data regarding the state of the user in the target period based on the switching to the second operation mode to the interested party terminal (S53). Then, the case determination control unit 26 acquires the incident determination result from the interested party terminal (S54). The update unit 28 changes the operation content of the second operation mode based on the incident determination result (S55). Then, the information processing apparatus 20 returns the processing to S50.

As described above, according to the fourth example embodiment, the operation content of the ATM operation for collecting the state-related data, which is the basis for determining the presence or absence of an incident, is changed according to the incident determination result. Therefore, the determination of the presence or absence of an incident can be speeded up, and the determination accuracy can be improved. As a result, it is possible to shorten the time for arresting the user for the ATM operation, and to avoid an unpleasant situation in which attention is attracted in a case where a transaction having no incident is executed due to erroneous determination. As a result, it is possible to contribute to the prevention of the occurrence of the case or the quick resolution while suppressing the increase in the psychological burden on the user.

Fifth Example Embodiment

Figure 20:
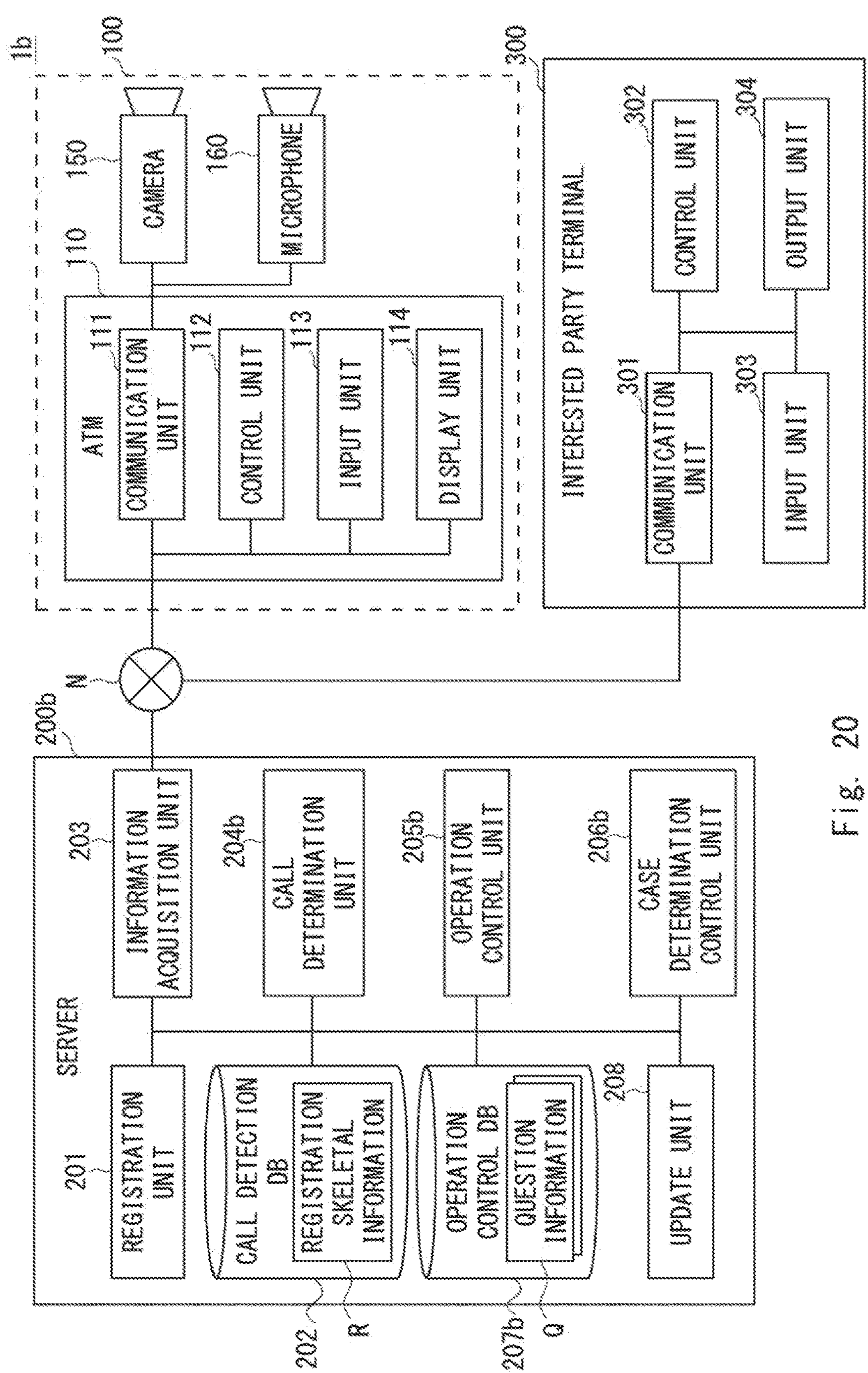
FIG. 20 is a block diagram illustrating an overall configuration of an information processing system according to a fifth example embodiment.

Next, a fifth example embodiment of the present disclosure will be described. The fifth example embodiment is an example embodiment embodying the fourth example embodiment in an information processing system similar to the third example embodiment. FIG. 20 is a block diagram illustrating an overall configuration of an information processing system 1*b* according to the fifth example embodiment.

The information processing system 1*b* is different from the information processing system 1*a* in including a server 200*b* instead of the server 200*a*.

The server 200*b* includes a call determination unit 204*b*, an operation control DB 207*b*, an operation control unit 205*b*, and an update unit 208 instead of the call determination unit 204, the operation control DB 207, and the operation control unit 205*a*.

The call determination unit 204*b* is an example of the above-described call determination unit 24. The call determination unit 204*b* determines whether the user is talking on a phone based on at least one of the frame image and the voice data included in the video data of the target area. As an example, the call determination unit 204*b* performs call determination by a method similar to that of the call determination unit 204 of the second and third example embodiments.

The operation control DB 207*b* stores operation contents of the second operation mode.

FIG. 21 is a diagram illustrating an example of a data structure of the operation control DB 207*b* according to the fifth example embodiment. For example, the operation control DB 207*b* stores the question information Q1 to Q4 as the operation content, similarly to the operation control DB 207 of the third example embodiment. However, the operation control DB 207*b* is different from the operation control DB 207 in that information on the priority order to be output is stored for each question information Q. The priority order is determined based on importance indicating how much the answer information corresponding to the question information contributes to the determination of the presence or absence of the incident.

Returning to FIG. 20, the description will be continued. The operation control unit 205*b* is an example of the operation control unit 25 described above. When it is determined that the user is talking on a phone, the operation control unit 205*b* reads the operation content of the second operation mode from the operation control DB 207*b* and instructs the ATM 110 to perform the operation according to the operation content, similarly to the operation control unit 205*a* of the third example embodiment. As a result, the operation mode of the ATM 110 is switched from the normal mode to the second operation mode. In the present fifth example embodiment, the operation control DB 207*b* stores the question information Q. Then, in the second operation mode, the operation control unit 205*b* causes the ATM 110 to output the question information Q stored in the operation control DB 207*b*. At this time, the ATM 110 is caused to output the question information Q in descending order of priority order among the question information Q stored in the operation control DB 207*b*.

Note that the operation control unit 205*b* may end the output of the question information Q by the ATM 110 and switch to the normal mode in response to the acquisition of the determination result indicating the presence of the incident. As a result, unnecessary restraint of the user can be prevented, and an ATM operation time can be shortened.

Then, the case determination control unit 206*b* includes a response to the question information Q in the state-related data and transmits the response to the interested party terminal 300. The state-related data may further include data of the same data type as the data used for the call determination by the call determination unit 204*b*, for example, a frame image included in the video data.

Note that the case determination control unit 206*b* is an example of the case determination control unit 26 described above, but has the same function as the case determination control unit 206*a* of the third example embodiment, and thus description thereof is omitted.

The update unit 208 is an example of the update unit 28 described above. The update unit 208 changes the output priority order of at least one question information Q among the question information Q stored in the operation control DB 207*b* based on the output question information Q and the incident determination result.

Specifically, first, the update unit 208 calculates the importance to the determination result for each question information Q based on the incident determination result and the question information Q accumulated so far. Then, the update unit 208 re-orders the priority order according to the importance. Re-ordering of the priority order according to the importance may be, for example, determining the priority order such that the priority order becomes higher as the importance is higher. Then, the update unit 208 stores each question information Q and the priority order in association with each other in the operation control DB 207*b*. Alternatively, the update unit 208 may rearrange the question information Q stored in the operation control DB 207*b* in descending order of the priority order. With such a function, the output order of the question information Q when the second operation mode is executed next time can be suitably changed.

Note that the calculation of the importance may be performed based on the number of pieces of the question information Q output from the start of output of the question information Q to the end of output after the interested party determines the incident. As an example, in a case where the number of pieces of the output question information Q is less than a predetermined number, the update unit 208 may increase the importance of the output question information Q by a predetermined amount. Note that, since there is a high possibility that the question information Q immediately before the determination of the incident has triggered the determination, the increase width of the importance may be made larger by a predetermined amount than the output other question information Q.

Figure 22:
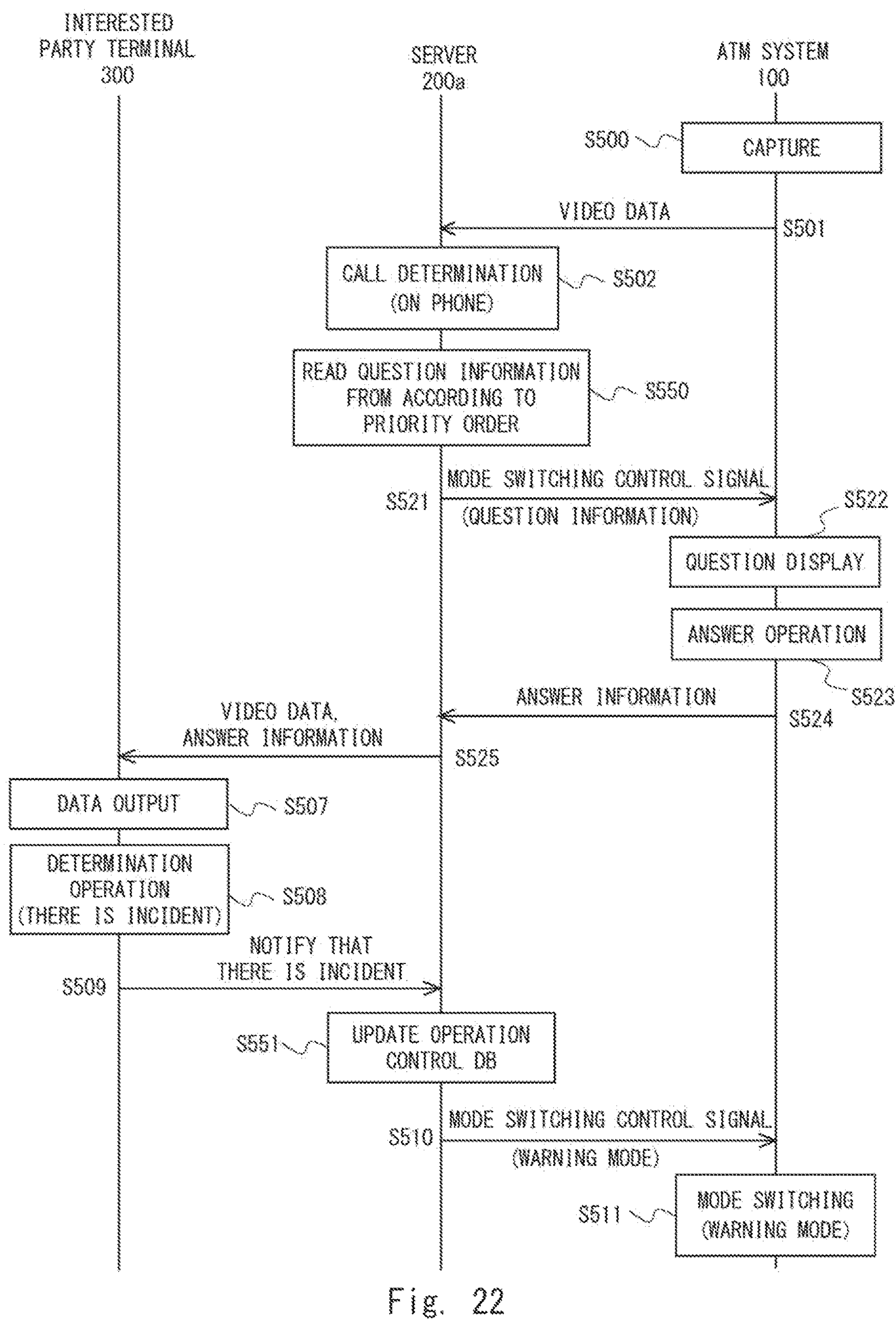
FIG. 22 is a sequence diagram illustrating an example of a flow of incident determination processing according to the fifth example embodiment.

FIG. 22 is a sequence diagram illustrating an example of a flow of incident determination processing according to the fifth example embodiment. The step of FIG. 22 is different from the step of FIG. 14 in including S550 and S551 instead of S520 of FIG. 14.

In S550, the operation control unit 205*b* of the server 200*b* reads the question information Q from the operation control DB 207*b* according to the priority order. Then, the operation control unit 205*b* transmits a mode switching control signal including the read question information Q to the ATM 110 of the ATM system 100 via the network N (S521), and causes the ATM 110 to display the question information Q on the display unit 114 (S522).

Furthermore, in S509, the control unit 302 of the interested party terminal 300 notifies the server 200 that there is an incident as an incident determination result, and then S551 is executed. In S551, the update unit 208 changes the priority order of the question information Q stored in the operation control DB 207*b* based on the output question information and the incident determination result, and stores the priority order in the operation control DB 207*b*. As a result, the update unit 208 updates the operation control DB 207*b*.

As described above, according to the fifth example embodiment, the output order of the question information for collecting the state-related data, which is the basis for determining the presence or absence of the incident, is optimized based on the incident determination result. Therefore, the incident determination can be made quickly, and the determination accuracy can be improved. Accordingly, an effect similar to that of the fourth example embodiment is obtained.

Note that the fifth example embodiment can be modified as follows.

First Modified Example of Fifth Example Embodiment

In the above description, the interested party performs the incident determination, but the case determination control unit 206*b* of the server 200*b* may perform the case determination, or both may perform the case determination. As an example of the latter, as in the second modified example of the third example embodiment, the case determination control unit 206*b* of the server 200*b* may execute the primary determination on the presence or absence of the incident, and the interested party terminal 300 may execute the secondary determination on the presence or absence of the incident.

In this case, the case determination processing is processing in which S550 of FIGS. 22 and S551 of FIG. 22 are added to the step of FIG. 17 instead of S520 of FIG. 17. S503 to S505 may be omitted. Note that, in this case, in a case where it is determined in the primary determination that there is an incident based on at least a response to the question information Q registered in the operation control DB 207*b* in the second operation mode, the operation control unit 205*b* may end the output of the question information Q. As a result, while the effect of the fourth example embodiment is exhibited, the secondary determination by the interested party is omitted in a case where there is no incident in the primary determination, so that the monitoring load on the interested party can be reduced.

Figure 23:
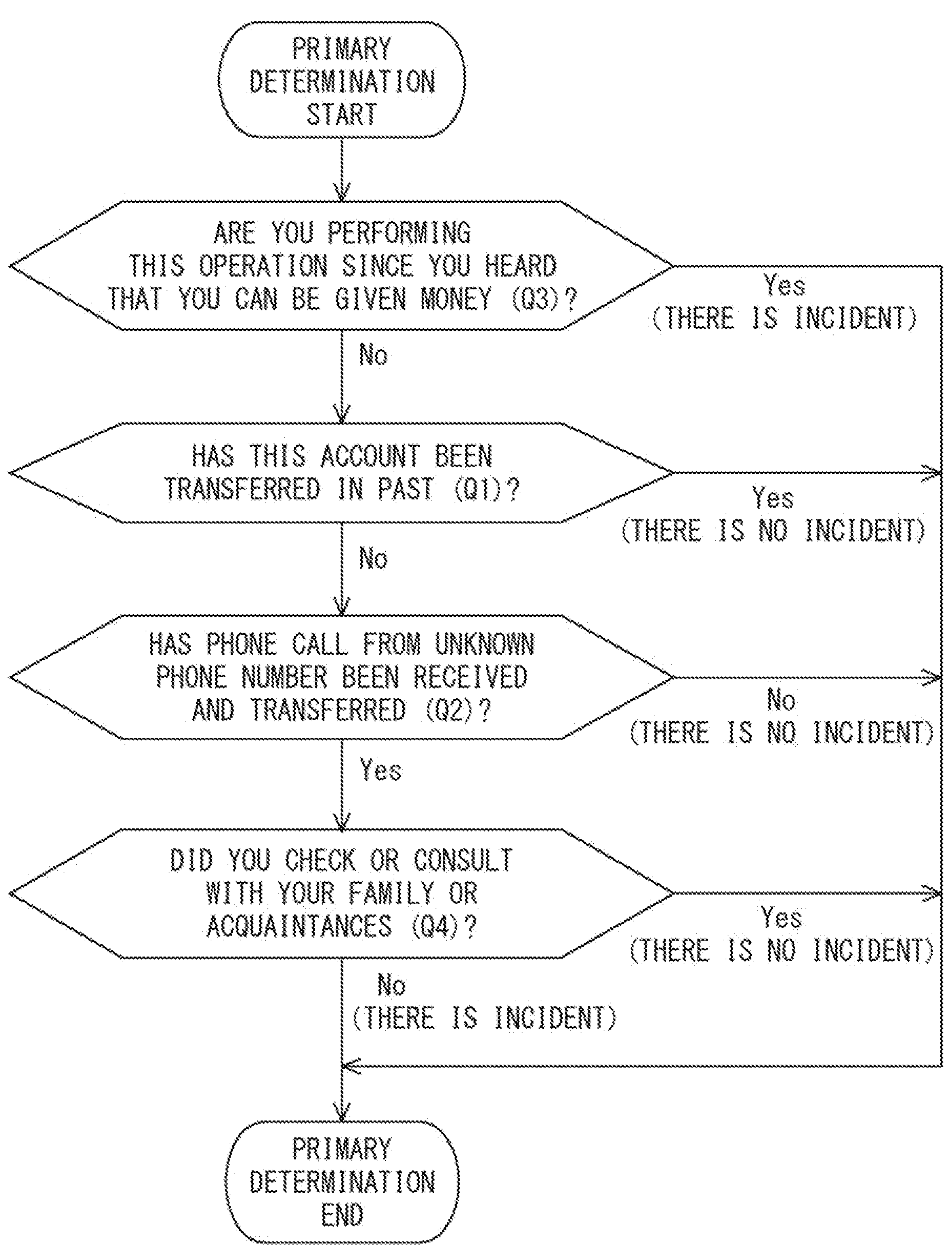
FIG. 23 is a diagram illustrating a decision tree for primary determination of presence or absence of an incident according to a first modified example of the fifth example embodiment.

In this case, the operation control DB 207*b* may store various parameters for constructing the decision tree as illustrated in FIG. 23 in addition to the question content and the priority order for each question information Q.

FIG. 23 is a diagram illustrating a decision tree for primary determination of presence or absence of the incident according to the fifth example embodiment. First, the question information Q3 having the highest priority order is displayed on the display unit 114 of the ATM 110. Here, in a case where the user answers "Yes" to the question information Q3, the case determination control unit 206*b* determines that "there is an incident". Therefore, the primary determination result is "there is an incident", and the case determination control unit 206*b* transmits the answer information to the interested party terminal 300. In this case, the operation mode of the ATM 110 may be the second operation mode in which the question information Q is continuously output, or may be shifted to the operation mode for securing time.

Meanwhile, when the user answers "No" to the question information Q3, the question information Q1 having the second highest priority order is displayed on the display unit 114 of the ATM 110. Here, in a case where the user answers "Yes" to the question information Q1, the case determination control unit 206*b* determines that "there is no incident". Therefore, the primary determination result is "there is no incident", and the question output ends. Then, the operation mode of the ATM system 100 returns to the normal mode.

Meanwhile, when the user answers "No" to the question information Q1, the question information Q2 having the third highest priority order is displayed on the display unit 114 of the ATM 110. Here, in a case where the user answers "No" to the question information Q2, the case determination control unit 206*b* determines that "there is no incident". Therefore, the primary determination result is "there is no incident", and the question output ends. Then, the operation mode of the ATM system 100 returns to the normal mode.

Meanwhile, when the user answers "Yes" to the question information Q2, the question information Q4 having the fourth highest priority order is displayed on the display unit 114 of the ATM 110. Here, in a case where the user answers "Yes" to the question information Q4, the case determination control unit 206*b* determines that "there is no incident". Therefore, the primary determination result is "there is no incident", and the question output ends. Then, the operation mode of the ATM system 100 returns to the normal mode.

Meanwhile, when the user answers "No" to the question information Q4, the case determination control unit 206*b* determines that "there is an incident". Therefore, the primary determination result is "there is an incident", and the case determination control unit 206*b* transmits the answer information to the interested party terminal 300. In this case, the operation mode of the ATM 110 may be the second operation mode in which the question information Q is continuously output, or may be shifted to the operation mode for securing time.

Note that although the decision tree for the primary determination is used in FIG. 23, the above-described decision tree may also be used in a case where only the case determination control unit 206*b* of the server 200*b* determines the presence or absence of an incident.

Second Modified Example of Fifth Example Embodiment

In addition, the first modified example of the third example embodiment and the fifth example embodiment may be combined. That is, the case determination control unit 206*b* of the server 200*b* may use voice data in addition to the video data and the answer information of the target period as the basis of the incident determination. The voice data to be one of the bases of the incident determination is voice data after the microphone on control, and may include at least voice data in the target period.

Figure 24:
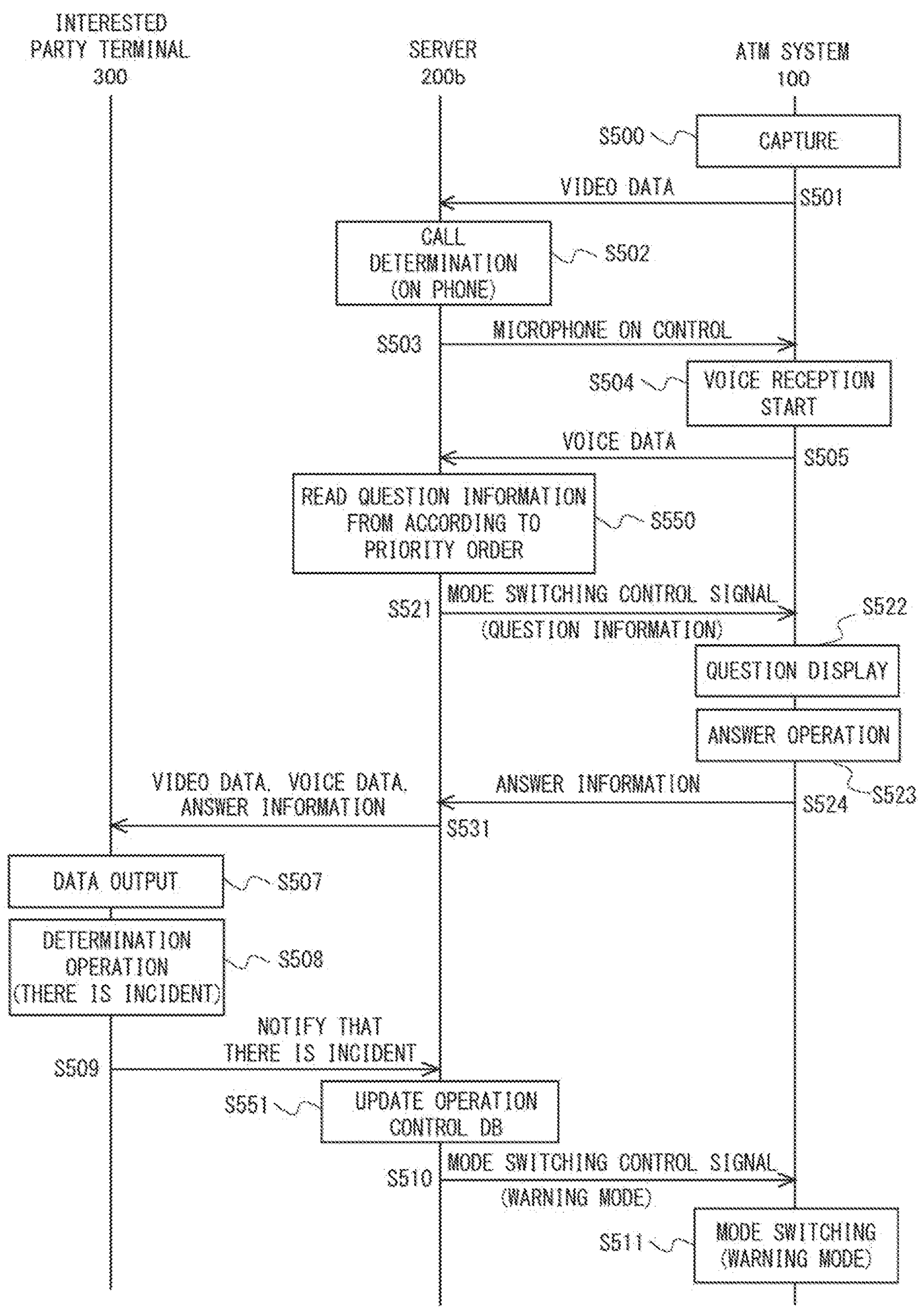
FIG. 24 is a sequence diagram illustrating an example of a flow of incident determination processing according to a second modified example of the fifth example embodiment.

FIG. 24 is a sequence diagram illustrating an example of a flow of incident determination processing according to a modified example of the fifth example embodiment. The step of FIG. 24 is obtained by adding S550 of FIGS. 22 and S551 of FIG. 22 to the step of FIG. 16 instead of S520 of FIG. 16. S551 may be performed at any timing after S509 is performed. As a result, it is possible to more easily determine the presence or absence of an incident while obtaining the effect of the fourth example embodiment. In addition, erroneous determination can be further prevented.

Sixth Example Embodiment

Next, a sixth example embodiment of the present disclosure will be described. The sixth example embodiment is characterized in that the update unit 208 of the server 200*b* updates the call detection DB 202 used for call determination.

In the sixth example embodiment, the call determination unit 204*b* determines whether the user is talking on a phone based on at least one of a plurality of frame images included in the video data of the target area acquired from the ATM 110. For example, when a predetermined number or more of frame images from which it can be determined that the user is talking on a phone are present in the video, the call determination unit 204*b* may comprehensively determine that the user is talking on a phone. In a case where the call availability is comprehensively determined in this manner, there is a high possibility of erroneous determination for a frame image for which the individual call determination result does not match the comprehensive call determination result. Therefore, in this case, the update unit 208 may update the registration skeletal information R of the call detection DB 202 for the frame image. The update of the registration skeletal information R may be processing including at least one of deletion, change, and addition.

For example, even in a case where the call determination unit 204*b* comprehensively determines that the user is talking on a phone, in a case where the interested party determines the presence or absence of an incident, when it can be recognized that the user does not talk on a phone, the call determination is wrong. Therefore, the update unit 208 may receive a notification indicating erroneous determination or a request to change the registration skeletal information R of the normal example from the interested party terminal 300. Then, the update unit 208 may update the registration skeletal information R of the normal example registered in the call detection DB 202. Furthermore, for example, in a case where the interested party is determined to have the incident, it is recognized by the interested party that the user has been talking on the phone. Therefore, when receiving the incident determination result from the interested party terminal 300, the update unit 208 may determine whether to update the skeletal information extracted from the frame image as the registration skeletal information R of the normal example based on the call determination result of each frame image and the incident determination result.

In addition, when the interested party or the administrator of the ATM 110 browses video data that has not been determined to be on the phone and can recognize that the user is talking on a phone, the call determination is also wrong. Therefore, the update unit 208 may receive a notification indicating erroneous determination or a registration request of registration skeletal information of a negative example from the interested party terminal 300. In this case, skeletal information extracted from a frame image included in the video data may be registered as the registration skeletal information of a negative example. The registration skeletal information of the negative example may be used at the time of call determination. For example, the call determination unit 204*b* may determine that a call is not being made for a frame image having skeletal information of which the similarity with the registration skeletal information of the negative example is equal to or greater than a predetermined threshold. This improves accuracy of call determination.

Figure 25:
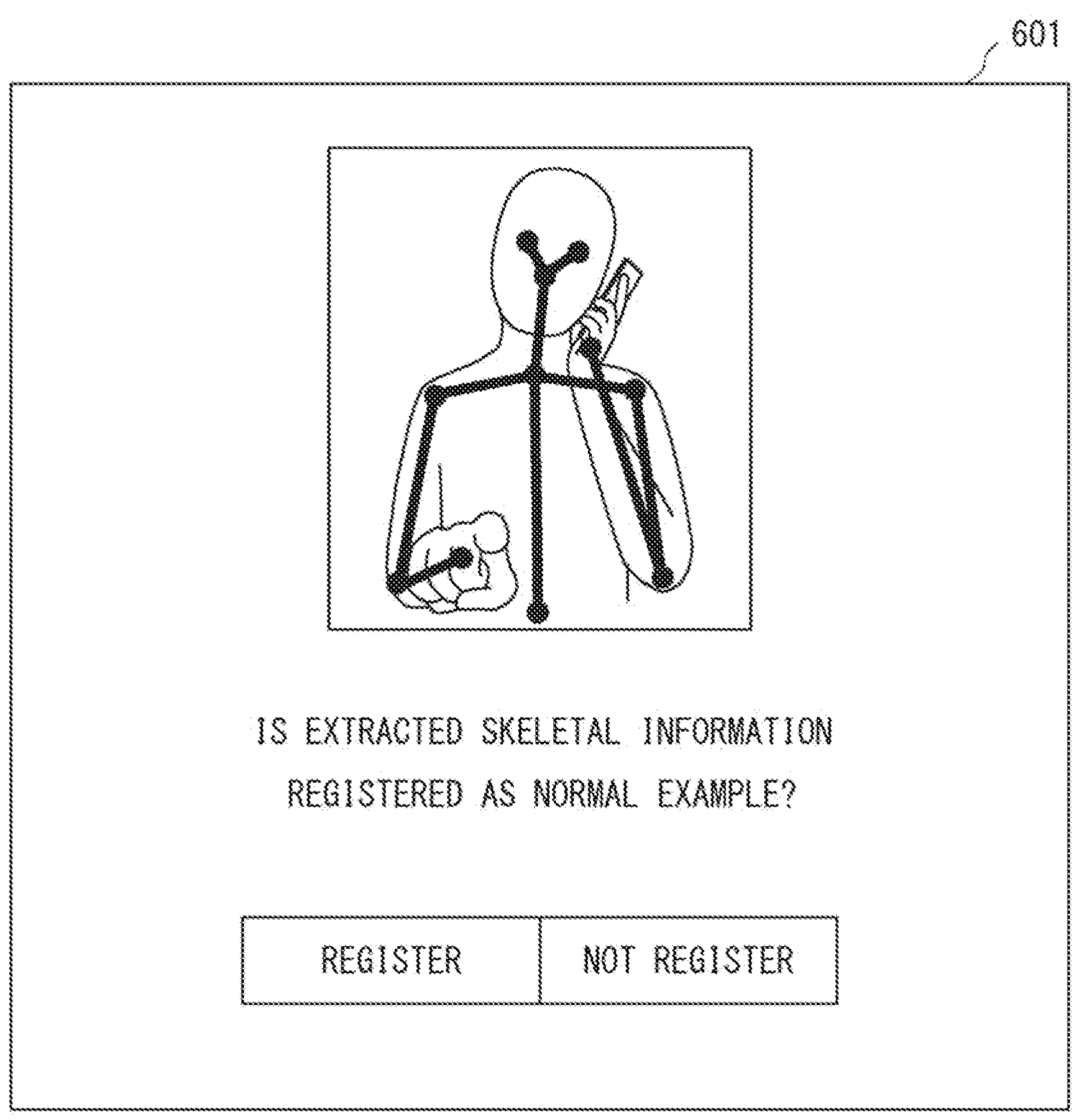
FIG. 25 is a diagram illustrating an example of display on a display unit of an interested party terminal according to the sixth example embodiment.

FIG. 25 is a diagram illustrating an example of a display screen 601 according to the sixth example embodiment. The display screen 601 may be displayed on the display unit of the interested party terminal 300 or the display unit of the management terminal used by the administrator of the ATM 110. The display screen 601 includes frame images for which it is comprehensively determined that the user is talking on a phone but it is not individually determined that the user is talking on a phone. In addition, the display screen 601 further includes a display for causing the interested party or the administrator to determine whether to register skeletal information extracted from the frame image as the normal example. Note that, in this drawing, the skeletal information extracted from the frame image is also displayed on the display screen 601. The interested party or the administrator who has browsed such a display screen 601 may consider whether to register the skeletal information as the normal example, and may transmit a registration request to the server 200*b* in a case of registering the skeletal information. As a result, the update unit 208 registers skeletal information in the call detection DB 202 as the normal example in order to prevent erroneous determination on an image similar to the frame image that has been erroneously determined.

In the above-described example embodiment, the configuration of the hardware has been described, but example is not limited thereto. The present disclosure can also be implemented by causing a processor to execute a computer program.

In the above-described example, the program includes a group of instructions (or software code) for causing a computer to perform one or more functions described in the example embodiments when being read by the computer. The program may be stored in a non-transitory computer-readable medium or a tangible storage medium. By way of example, and not limitation, computer-readable media or tangible storage media include random-access memory (RAM), read-only memory (ROM), flash memory, solid-state drive (SSD) or other memory technology, CD-ROM, digital versatile disc (DVD), Blu-ray® disc or other optical disk storage, magnetic cassettes, magnetic tape, magnetic disk storage, or other magnetic storage devices. The program may be transmitted on a transitory computer-readable medium or a communication medium. By way of example, and not limitation, transitory computer-readable or communication media include electrical, optical, acoustic, or other forms of propagated signals.

Note that the present disclosure is not limited to the above example embodiment, and can be appropriately changed without departing from the gist. For example, the call determination DB 202 or the operation control DB 207 and 207*b* of the servers 200, 200*a*, and 200*b* may be included in an external apparatus communicably connected to the servers 200, 200*a*, and 200*b* instead of the servers 200, 200*a*, and 200*b*.

Further, for example, some or all of the functions of the servers 200, 200*a*, and 200*b* may be included in the ATM 110. As an example, the ATM 110 may have the functions of the call determination unit 204 and 204*b* and the operation control units 205, 205*a*, and 205*b* of the servers 200, 200*a*, and 200*b*. In addition, the ATM 110 may have the functions of the case determination control units 206,206*a*, and 206*b* of the servers 200, 200*a*, and 200*b*.

In addition, the captured image used for the call determination may be a frame image captured at a predetermined timing. For example, the frame image may include, as an example, at least one of a frame image when the user U operates the ATM 110 for the first time, a frame image when a passbook or a cash card is inserted, and a frame image when the transfer operation is started.

Some or all of the above example embodiments may be described as the following supplementary notes, but are not limited to the following.

Supplementary Note A1

An information processing apparatus comprising:

call determination means for determining whether a user who has visited an automatic teller machine (ATM) is talking on a phone calling based on first data that is any one of a captured image, voice data, and received radio wave data related to a target area based on the ATM;

operation control means for starting acquisition of second data that suggests a state of the user and has a data type different from that of the first data in a case where it is determined that the user is talking on a phone; and case determination control means for acquiring a determination result of presence or absence of an incident using the first data and the second data.

Supplementary Note A2

The information processing apparatus according to Supplementary Note A1, wherein the first data is a captured image obtained by capturing the user who has visited the ATM, and the second data is voice data collected by a microphone provided at a predetermined position based on the ATM.

Supplementary Note A3

The information processing apparatus according to Supplementary Note A2, wherein the case determination control means estimates a talk content based on the voice data, and determines the presence or absence of the incident based on the captured image and the talk content.

Supplementary Note A4

The information processing apparatus according to Supplementary Note A1 or A2, wherein the case determination control means transmits the first data and the second data to an interested party terminal used by an interested party, and receives, from the interested party terminal, a determination result of presence or absence of an incident input to the interested party terminal.

Supplementary Note A5

The information processing apparatus according to Supplementary Note A4, wherein the case determination control means transmits user information regarding the user to the interested party terminal together with the first data and the second data Supplementary Note A6

The information processing apparatus according to Supplementary Note A4 or A5, wherein the case determination control means switches an operation mode of the ATM to a third operation mode in a case where an instruction for switching the operation mode of the ATM to the third operation mode in which an operation different from a normal operation is executed is received from the interested party terminal as the determination result of the presence or absence of the incident.

Supplementary Note A7

The information processing apparatus according to any one of Supplementary Notes A1 to A6, wherein the operation control means switches an operation mode of the ATM to a second operation mode in which an operation different from a normal operation is executed when it is determined that the user is talking on a phone.

Supplementary Note A8

The information processing apparatus according to Supplementary Note A7, wherein the operation control means causes the ATM to output question information stored in advance in an operation control DB in the second operation mode.

Supplementary Note A9

The information processing apparatus according to Supplementary Note A8, wherein the case determination control means acquires the determination result of the presence or absence of the incident by further using a response to the question information.

Supplementary Note A10

The information processing apparatus according to Supplementary Note A8 or A9, wherein the case determination control means performs primary determination on the presence or absence of the incident based on a response to the question information, transmits the first data and the second data to an interested party terminal used by an interested party when a result of the primary determination indicates the presence of the incident, and receives, from the interested party terminal, the determination result of the presence or absence of the incident input to the interested party terminal.

Supplementary Note A11

An information processing system comprising:

an automatic teller machine (ATM); and an information processing apparatus, wherein the information processing apparatus includes call determination means for determining whether a user who has visited the ATM is talking on a phone calling based on first data that is any one of a captured image, voice data, and received radio wave data related to a target area based on the ATM, operation control means for starting acquisition of second data that suggests a state of the user and has a data type different from that of the first data in a case where it is determined that the user is talking on a phone, and case determination control means for acquiring a determination result of presence or absence of an incident using the first data and the second data.

Supplementary Note A12

An information processing method comprising:

determining whether a user who has visited an automatic teller machine (ATM) is talking on a phone calling based on first data that is any one of a captured image, voice data, and received radio wave data related to a target area based on the ATM;

starting acquisition of second data that suggests a state of the user and has a data type different from that of the first data in a case where it is determined that the user is talking on a phone; and acquiring a determination result of presence or absence of an incident using the first data and the second data.

Supplementary Note A13

A non-transitory computer-readable medium storing a program for causing a computer to execute:

a procedure of determining whether a user who has visited an automatic teller machine (ATM) is talking on a phone calling based on first data that is any one of a captured image, voice data, and received radio wave data related to a target area based on the ATM;

a procedure of starting acquisition of second data that suggests a state of the user and has a data type different from that of the first data in a case where it is determined that the user is talking on a phone; and a procedure of acquiring a determination result of presence or absence of an incident using the first data and the second data.

Supplementary Note B1

An information processing apparatus comprising:

call determination means for determining whether a user who has visited an automatic teller machine (ATM) is talking on a phone based on at least one of a captured image, voice data, and received radio wave data of a target area based on the ATM;

operation control means for switching an operation mode of the ATM from a first operation mode in which a normal operation is executed to a second operation mode in which information at least partially different from information output in the first operation mode is output in a case where it is determined that the user is talking on a phone;

case determination control means for transmitting data suggesting a state of the user in a target period based on the switching to an interested party terminal used by an interested party, and acquiring a determination result as to whether there is an incident from the interested party terminal; and update means for changing an operation content of the second operation mode based on at least a determination result of the presence or absence of the incident.

Supplementary Note B2

The information processing apparatus according to Supplementary Note B1, wherein the call determination means determines whether the user is talking on a phone based on data of at least one of the captured image and the voice data of the target area, and the data suggesting the state of the user includes data of the same data type as the data used for determining the call.

Supplementary Note B3

The information processing apparatus according to Supplementary Note B1 or B2, wherein the operation control means causes the ATM to output question information stored in an operation control DB in the second operation mode, and the case determination control means transmits a response to the question information to the interested party terminal as at least a part of the data suggesting a state of the user.

Supplementary Note B4

The information processing apparatus according to Supplementary Note B3, wherein in the second operation mode, in a case where it is determined that there is an incident based on at least a response to question information stored in advance in the operation control DB, the operation control means ends output of the question information stored in the operation control DB.

Supplementary Note B5

The information processing apparatus according to Supplementary Note B3 or B4, wherein the update means changes a priority order of output of at least one piece of question information stored in the operation control DB based on the output question information and the determination result of the presence or absence of the incident.

Supplementary Note B6

The information processing apparatus according to any one of Supplementary Notes B to B5, wherein the call determination means determines whether the user is talking on a phone based on a similarity between at least a part of skeletal information extracted from the captured image obtained by capturing the user who has visited the ATM and at least a part of registration skeletal information extracted from a registered image registered in advance in a call determination DB, and the update means updates the registration skeletal information registered in the call determination DB based on at least a determination result of the presence or absence of the incident.

Supplementary Note B7

An information processing system comprising:

an automatic teller machine (ATM); and an information processing apparatus, wherein the information processing apparatus includes call determination means for determining whether a user who has visited the ATM is talking on a phone based on at least one of a captured image, voice data, and received radio wave data of a target area based on the ATM, operation control means for switching an operation mode of the ATM from a first operation mode in which a normal operation is executed to a second operation mode in which information at least partially different from information output in the first operation mode is output in a case where it is determined that the user is talking on a phone, case determination control means for transmitting data suggesting a state of the user in a target period based on the switching to an interested party terminal used by an interested party, and acquiring a determination result as to whether there is an incident from the interested party terminal, and update means for changing an operation content of the second operation mode based on at least a determination result of the presence or absence of the incident.

Supplementary Note B8

An information processing method comprising:

determining whether a user who has visited an automatic teller machine (ATM) is talking on a phone based on at least one of a captured image, voice data, and received radio wave data of a target area based on the ATM;

switching an operation mode of the ATM from a first operation mode in which a normal operation is executed to a second operation mode in which information at least partially different from information output in the first operation mode is output in a case where it is determined that the user is talking on a phone;

transmitting data suggesting a state of the user in a target period based on the switching to an interested party terminal used by an interested party, and acquiring a determination result as to whether there is an incident from the interested party terminal; and changing an operation content of the second operation mode based on at least a determination result of the presence or absence of the incident.

Supplementary Note B9

A non-transitory computer-readable medium storing a program for causing a computer to execute:

a procedure of determining whether a user who has visited an automatic teller machine (ATM) is talking on a phone based on at least one of a captured image, voice data, and received radio wave data of a target area based on the ATM;

a procedure of switching an operation mode of the ATM from a first operation mode in which a normal operation is executed to a second operation mode in which information at least partially different from information output in the first operation mode is output in a case where it is determined that the user is talking on a phone;

a procedure of transmitting data suggesting a state of the user in a target period based on the switching to an interested party terminal used by an interested party, and acquiring a determination result as to whether there is an incident from the interested party terminal; and a procedure of changing an operation content of the second operation mode based on at least a determination result of the presence or absence of the incident.

REFERENCE SIGNS LIST

1, **1*a*, 1*b*** INFORMATION PROCESSING SYSTEM
10, 20, 200, **200*a*, 200*b*** INFORMATION PROCESSING APPARATUS (SERVER)
14, 24, 204 CALL DETERMINATION UNIT
15, 25, 205, **205*a*, 205*b*** OPERATION CONTROL UNIT
16, 26, 206, **206*a*, 206*b*** CASE DETERMINATION CONTROL UNIT
100, **100*c*** ATM system
110, **110*c*** ATM
111 COMMUNICATION UNIT
112, **112*c*** CONTROL UNIT
113 INPUT UNIT
114 DISPLAY UNIT
150 CAMERA
160 MICROPHONE
201 REGISTRATION UNIT
202 CALL DETECTION DB
203 INFORMATION ACQUISITION UNIT
207, **207*b*** OPERATION CONTROL DB
28, 208 UPDATE UNIT
300 INTERESTED PARTY TERMINAL
301 COMMUNICATION UNIT
302 CONTROL UNIT
303 INPUT UNIT
304 OUTPUT UNIT
500 FRAME IMAGE
U USER
P MOBILE PHONE
R REGISTRATION SKELETAL INFORMATION
I ICON
Q QUESTION INFORMATION

What is claimed is:

1. An information processing apparatus comprising:

at least one memory storing instructions; and at least one processor configured to execute the instructions to:

determine whether a user who has visited an automatic teller machine (ATM) is talking on a phone based on a comparison between skeleton information of the user and registered skeleton information, the skeleton information being obtained from first data by machine learning, the first data being a captured image related to a target area based on the ATM, and the registered skeleton information being information related to a phone call action;

start acquisition of second data that suggests a state of the user and has a data type different from that of the first data in a case where it is determined that the user is talking on a phone;

acquire a determination result of presence or absence of an incident using the first data and the second data;

update, based on the determination result of presence or absence of the incident, the registered skeleton information;

switch an operation mode of the ATM from a first operation mode, for executing a normal operation, to a second operation mode, for outputting information at least partially different from information outputted in the first operation mode, in a case where it is determined that the user is talking on a phone;

transmit data regarding a state of the user in a target period based on the switching to the second operation mode to an interested party terminal and acquire the determination result of presence or absence of the incident from a related party terminal; and change an operation content of the second operation based on at least the determination result of presence or absence of the incident.

2. The information processing apparatus according to claim 1, wherein at least one processor further configured to execute the instructions to:

estimate a talk content based on a voice data acquired at a predetermined position with respect to the ATM, which is the second data; and determine presence or absence of the incident based on the captured image and the talk content.

3. The information processing apparatus according to claim 1, wherein at least one processor configured to execute the instructions to:

transmit the first data and the second data to an interested party terminal used by an interested party; and receive, from the interested party terminal, a determination result of presence or absence of an incident input to the interested party terminal.

4. The information processing apparatus according to claim 3, wherein at least one processor configured to execute the instructions to transmit user information regarding the user to the interested party terminal together with the first data and the second data.

5. The information processing apparatus according to claim 1, wherein at least one processor configured to execute the instructions to cause the ATM to output question information stored in advance in an operation control database (DB) in the second operation mode.

6. The information processing apparatus according to claim 5, wherein at least one processor configured to execute the instructions to acquire the determination result of the presence or absence of the incident by further using a response to the question information.

7. The information processing apparatus according to claim 5, wherein at least one processor configured to execute the instructions to:

perform primary determination on the presence or absence of the incident based on a response to the question information;

transmit the first data and the second data to an interested party terminal used by an interested party when a result of the primary determination indicates the presence of the incident; and receive, from the interested party terminal, a determination result of presence or absence of an incident input to the interested party terminal.

8. The information processing apparatus according to claim 1, wherein the at least one processor is configured to execute the instructions to determine whether the user is talking on the phone based on a similarity between the skeleton information about a predetermined region of a body and the registered skeleton information about the predetermined region.

9. An information processing method comprising:

determining, by a computer, whether a user who has visited an automatic teller machine (ATM) is talking on a phone based on a comparison between skeleton information of the user and registered skeleton information, the skeleton information being obtained from first data by machine learning, the first data being a captured image related to a target area based on the ATM, and the registered skeleton information being information related to a phone call action;

starting, by the computer, acquisition of second data that suggests a state of the user and has a data type different from that of the first data in a case where it is determined that the user is talking on a phone;

acquiring, by the computer, a determination result of presence or absence of an incident using the first data and the second data;

updating, by the computer, based on the determination result of presence or absence of the incident, the registered skeleton information;

switching an operation mode of the ATM from a first operation mode, for executing a normal operation, to a second operation mode, for outputting information at least partially different from information outputted in the first operation mode, in a case where it is determined that the user is talking on a phone;

transmitting data regarding a state of the user in a target period based on the switching to the second operation mode to an interested party terminal and acquire the determination result of presence or absence of the incident from a related party terminal; and changing an operation content of the second operation based on at least the determination result of presence or absence of the incident.

10. A non-transitory computer-readable medium storing a program for causing a computer to execute:

a procedure comprising determining whether a user who has visited an automatic teller machine (ATM) is talking on a phone based on a comparison between skeleton information of the user and registered skeleton information, the skeleton information being obtained from first data by machine learning, the first data being a captured image related to a target area based on the ATM, and the registered skeleton information being information related to a phone call action;

starting acquisition of second data that suggests a state of the user and has a data type different from that of the first data in a case where it is determined that the user is talking on a phone;

acquiring a determination result of presence or absence of an incident using the first data and the second data; and updating, based on the determination result of presence or absence of the incident, the registered skeleton information;

switching an operation mode of the ATM from a first operation mode, for executing a normal operation, to a second operation mode, for outputting information at least partially different from information outputted in the first operation mode, in a case where it is determined that the user is talking on a phone;

transmitting data regarding a state of the user in a target period based on the switching to the second operation mode to an interested party terminal and acquire the determination result of presence or absence of the incident from a related party terminal; and changing an operation content of the second operation based on at least the determination result of presence or absence of the incident.

* * * * *